US010775290B2

(12) United States Patent
Flagan et al.

(10) Patent No.: US 10,775,290 B2
(45) Date of Patent: Sep. 15, 2020

(54) HIGHLY PORTABLE RADIAL DIFFERENTIAL MOBILITY ANALYZER

(71) Applicant: California Institute of Technology, Pasadena, CA (US)

(72) Inventors: Richard C. Flagan, Pasadena, CA (US); Stavros Amanatidis, Pasadena, CA (US); Changhyuk Kim, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 16/162,047

(22) Filed: Oct. 16, 2018

(65) Prior Publication Data

US 2019/0120743 A1    Apr. 25, 2019

Related U.S. Application Data

(60) Provisional application No. 62/573,051, filed on Oct. 16, 2017.

(51) Int. Cl.
*G01N 15/00* (2006.01)
*G01N 15/02* (2006.01)

(52) U.S. Cl.
CPC . *G01N 15/0266* (2013.01); *G01N 2015/0038* (2013.01); *G01N 2015/0046* (2013.01)

(58) Field of Classification Search
CPC .................................................. G01N 15/0266
See application file for complete search history.

(56) References Cited

U.S. PATENT DOCUMENTS

| 5,117,190 | A | * | 5/1992 | Pourprix | ............ | G01N 15/0266 324/452 |
|---|---|---|---|---|---|---|
| 5,596,136 | A | | 1/1997 | Flagan et al. | | |
| 6,012,343 | A | * | 1/2000 | Boulaud | ............ | G01N 15/0266 73/865.5 |
| 6,905,029 | B2 | | 6/2005 | Flagan | | |
| 9,095,793 | B2 | | 8/2015 | Flagan et al. | | |

OTHER PUBLICATIONS

ICRP, "Human Respiratory Tract Model for Radiological Protection" International Commission on Radiological Protection, 1994, pp. 1-489, vol. 24, Nos. 1-3, Publication 66, Oxford, Pergommon Press.
Rohmann, H., "Methode Zur Messung Der Größe Von Schwebeteilchen." Zeitschrift Für Physik, 1923, pp. 253-265, vol. 57, No. 1.

(Continued)

*Primary Examiner* — Eliza W Osenbaugh-Stewart
(74) *Attorney, Agent, or Firm* — Gates & Cooper LLP

(57) ABSTRACT

The present disclosure describes a compact and lightweight, radial-flow DMA designed to operate at low aerosol and sheath flowrates (on the order of 0.3 L/min aerosol flow, and 0.6-1.2 L/min sheath flow) and so as to classify aerosols including particles having sizes in the 10-500 nm range. Thus, the DMA is capable of operating at relatively low resolution ($R_{ND}$=2-4) to minimize both instrument volume and pumping/power requirements, while enabling size distribution measurement with the precision required for desired applications.

21 Claims, 23 Drawing Sheets

(56) References Cited

OTHER PUBLICATIONS

Hewitt, G.W., "The Charging of Small Particles for Electrostatic Precipitation", Transactions of the American Institute of Electrical Engineers, Part I: Communication and Electronics, Jul. 1957, pp. 300-306, vol. 76, No. 3.
Knutson, E.O., et al., "Aerosol Classification by Electric Mobility: Apparatus, Theory, and Applications", Aersol Sci., 1975, pp. 443-451, vol. 6.
Winklmayr, W., et al., "A New Electromobility Spectrometer for the Measurement of Aerosol Size Distributions in the Size Range From 1 to 1000 Nm", Journal of Aerosol Science, 1991, pp. 289-296, vol. 22, No. 3.
Zhang, S-H., et al., "Radial Differential Mobility Analyzer", Aerosol Science and Technology, 1995, pp. 357-372, vol. 23.
Mui, W., et al., "Design, simulation, and characterization of a radial opposed migration ion and aerosol classifier (ROMIAC)", Aerosol Science and Technology, 2017, pp. 801-823, vol. 51, No. 7.
Wang, S.C., et al., "Scanning Electrical Mobility Spectrometer", Aerosol Science and Technology, 1990, pp. 230-240, vol. 13.
Russell, L.M., et al., "Asymmetric Instrument Response Resulting from Mixing Effects in Accelerated DMA-CPC Measurements", Aerosol Science and Technology, 1995, pp. 491-509, vol. 23.
Dubey, P., et al., "Analysis of Scanning DMA Transfer Functions", Aerosol Science and Technology, 2008, pp. 544-555, vol. 42.
Erikson, H.A., "The Change of Mobility of the Positive Ions in Air with Age", Phys. Rev., pp. 100-101, vol. 18.
"An Introduction to Anti-Static, Dissipative, and Conductive Plastics", http://www.craftechind.com/an-introduction-to-anti-static-dissipative-and-conductive-plastics/, as downloaded Aug. 27, 2019.
"A Guide to Selecting Electrostatic-Dissipative Plastics", https://www.evaluationengineering.com/a-guide-to-selecting-electrostatic-dissipative-plastics, as downloaded Aug. 27, 2019.

\* cited by examiner

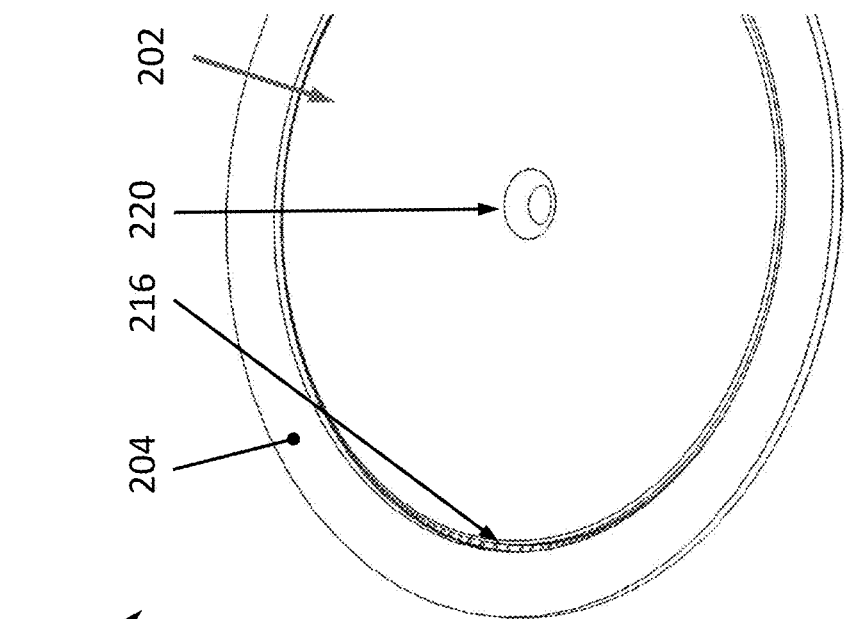
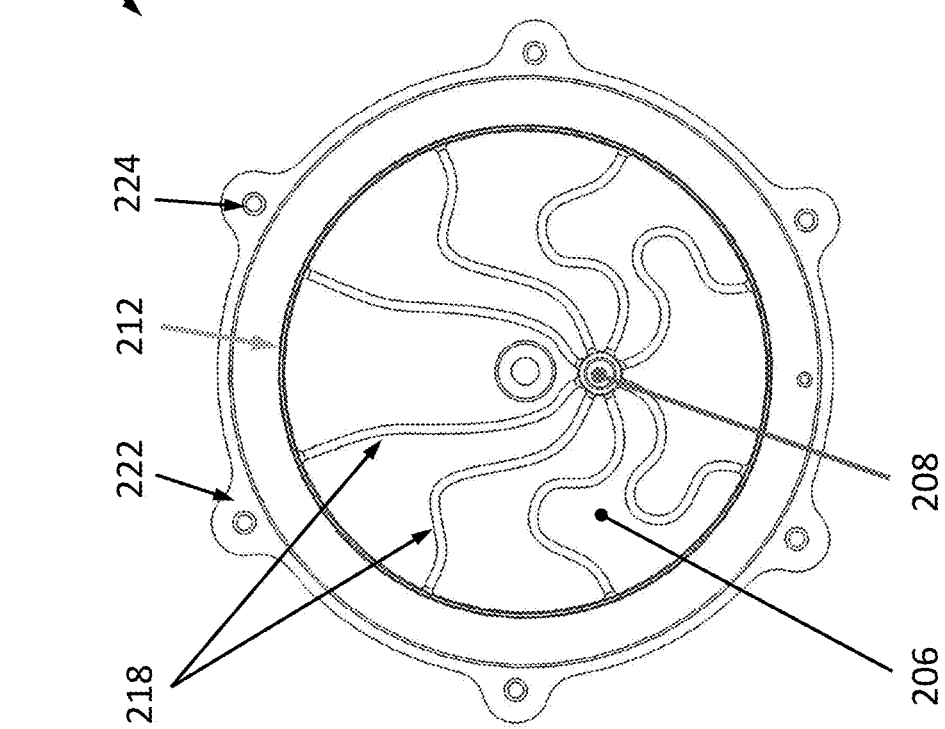
Figure 2B
Figure 2A

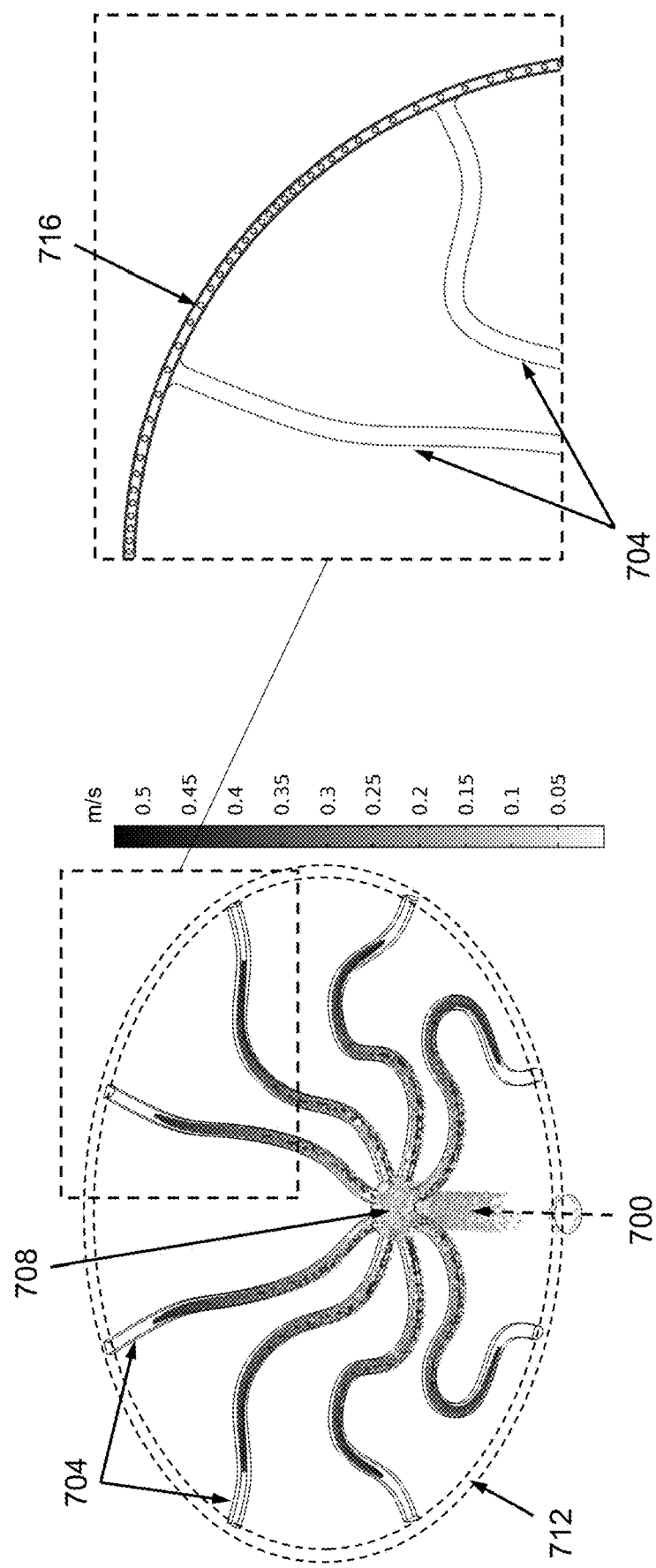

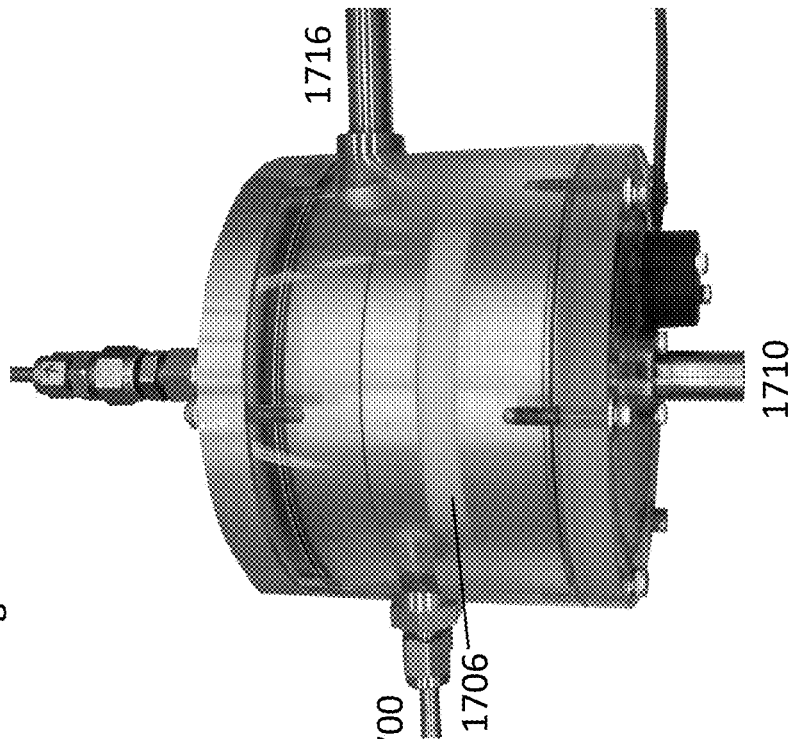
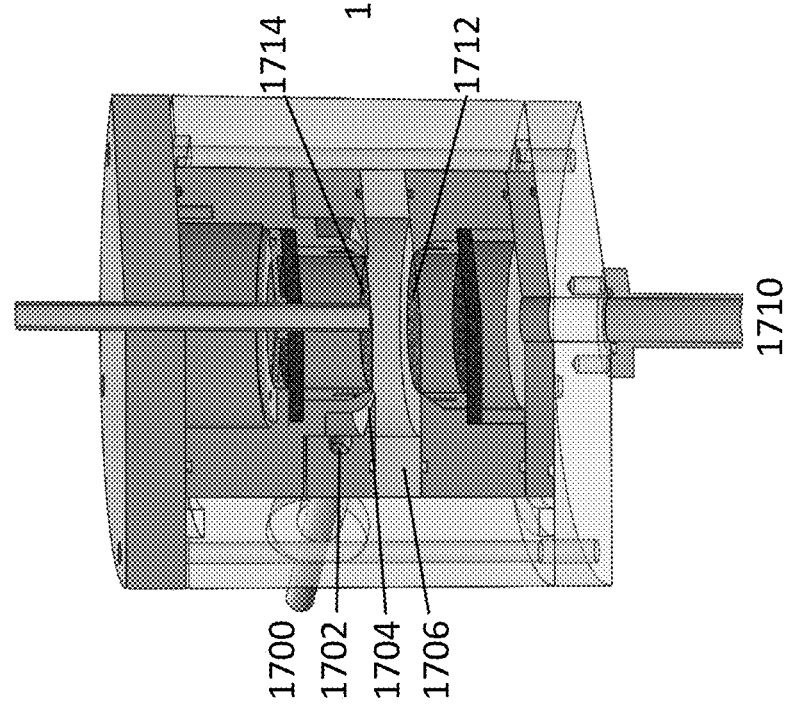
Figure 17B
Figure 17A

HIGHLY PORTABLE RADIAL DIFFERENTIAL MOBILITY ANALYZER

CROSS REFERENCE TO RELATED APPLICATIONS

This application claims the benefit under 35 U.S.C. Section 119(e) of commonly-assigned U.S. Provisional Patent Application Ser. No. 62/573,051 filed on Oct. 16, 2017, entitled "HIGHLY PORTABLE RADIAL DIFFERENTIAL MOBILITY ANALYZER," by Richard C. Flagan, Stavros Amanatidis, and Changhyuk Kim, (CIT-7884-P); which application is incorporated by reference herein.

STATEMENT REGARDING FEDERALLY SPONSORED RESEARCH AND DEVELOPMENT

This invention was made with government support under Grant No. DE-SC0013152/T-114134 awarded by the Department of Energy. The Government has certain rights in the invention.

BACKGROUND OF THE INVENTION

1. Field of the Invention

This invention relates to a differential mobility analyzer.

2. Description of the Related Art (Note: This application references a number of different publications as indicated throughout the specification by one or more reference numbers within brackets, e.g., [x]. A list of these different publications ordered according to these reference numbers can be found below in the section entitled "References." Each of these publications is incorporated by reference herein.) The Differential Mobility Analyzer (DMA) is the primary instrument in use today for the measurement of size distributions of aerosol particles in the submicrometer to nanometer size regime. The DMA separates charged particles in a gas according to their migration velocity in the presence of an applied electric field. Using particles of a known charge state, typically carrying one elementary charge of either positive or negative polarity, the migration velocity is determined by the strength of the applied field and the aerodynamic drag that acts to resist the motion of the particle. Hence, the particle size can be deduced from the migration velocity based upon the known aerodynamics of particles of representative shapes. Most commonly, particles are dense spheres, though other shapes are also found in air samples, including fractal aggregates found in soot and fumes of solid particles produced by high temperature sources; fibers, whiskers, rods, or nanowires, and other nonspherical shapes. Data are often represented in terms of a mobility-equivalent size, which is the size of a compact sphere with the same mobility (migration velocity per unit of applied electric field strength).

The electric field in the DMA is typically produced by applying a "high voltage" to one of two electrodes, and electrical ground to the other; particles are introduced near one electrode, and induced to migrate toward the other across a particle free sheath flow. Particles are introduced into the space between the electrodes as an aerosol flow, at volumetric flow rate $Q_a$ at an upstream location; a co-flowing particle-free sheath flow (flow rate $Q_{sh}$) separates the aerosol from the counter electrode. At a downstream location, a portion of the flow passing between the electrodes is extracted through a port or ports in the counter-electrode, and directed to a detector where the particles are counted, typically by a Condensation Particle Counter (CPC), or their number is otherwise inferred; an example of an alternate detection mode is the use of an electrometer to detect the transmitted charge. To determine the particle size distribution, measurements are made at a number of different applied voltages. The voltage may be stepped through a range of discrete values as in the so-called differential mobility particle sizer (DMPS), or scanned continuously through a programmed ramp in the scanning electrical mobility spectrometer (SEMS), also known as the scanning mobility particle sizer (SMPS).

Present-day DMA designs are based upon a strong theoretical foundation that describes the motion of particles through, and separation of charged particles as these are carried through the region between the two electrodes and migrate across the particle-free sheath gas from an entrance port in, or near, one electrode toward an outlet port at a downstream location in or near the second electrode under the action of a constant applied voltage between the two electrodes. Measurements at discrete voltages, as in the DMPS, require waiting substantial time between successive measurements to allow particles to be transmitted from the entrance of the DMA to its exit, from there to the entrance of the detector, and to the detection point within the detector, accounting for the distribution of delay times that occurs within the various components of the flow system, as well as additional delays in the detector response. Translation of the numbers of counts recorded at m successive voltages into the desired particle size distribution, requires solution of a so-called Fredholm integral equation of the form $$C_i = \int_0^\infty n(D_p) f(D_p) dD_p, i=1,2,\ldots,m \quad (1)$$

where $C_i$ is the number of counts recorded at voltage $V_i$ as the voltage is stepped through the m values of voltage for which measurements are made, $f(D_p)$ is the instrument response to a particle of size $D_p$, and $n(D_p)$ is the particle size distribution that is sought, which is defined such that $dN = n(D_p) dD_p$ is number of particles per unit volume in the size range from $D_p$ to $D_p + dD_p$. Both the theoretical foundation for this data inversion problem and the response function for the constant voltage DMA are well established, enabling accurate recovery of the particle size distribution from the set of count measurements made during voltage stepping within the DMPS.

To allow measurements of time-varying aerosols, most measurements are performed using the scanning voltage wherein particles are continuously counted. The initial theoretical development of the instrument response function during voltage scanning showed that, if the velocity within the classification region were uniform across the space between the electrodes, the DMA instrument response function would be the same as that for operation at constant voltage [1], but the effects of time delays within the detector could substantially distort the integrated instrument response function [2]. Subsequent theoretical and computational studies examined scanning operation of an ideal, cylindrical DMA with perfect azimuthal symmetry and fully developed laminar flow in which the velocity varies smoothly from zero at the surface of each cylindrical electrode to a maximum value near the center of the space between the electrodes. The velocity profile was found to distort the DMA response function owing to variation of the time in the scan that particles of a given size would exit the DMA [3]. The distribution of delays between the time when a particle enters the DMA and when it is detected in the measurement system allows particles of a given size to be counted during a number of counting time intervals. The resulting particle counts in successive counting intervals are inverted into the particle size distribution. This data inversion problem requires an integration of the counts over a finite counting time $$C_i = \int_{t_i}^{t_{i+1}} \int_0^\infty n(D_p) f(D_p, t) dD_p dt, i=1, 2, \ldots, m \quad (2)$$

The broadening of the instrument response function that results from these distortions that occur during voltage scanning must be taken into account during data inversion.

It is important to note that present understanding of voltage-scanning DMA size distribution measurements are based upon the assumption of perfect azimuthal symmetry for either radial-flow DMAs or axial-flow cylindrical DMAs, or perfect uniformity across the lateral dimension of planar DMAs. Asymmetry may have minor effects on measurements made with voltage stepping, but the effects on voltage-scanning measurements can be profound. Furthermore, both the design of DMAs and the characterization of their performance is based on the established art for constant voltage DMAs.

While most DMAs employ solid electrodes and introduce a sheath flow essentially parallel to coaxial cylinder, parallel plate, or parallel disk electrodes, an alternate design replaces the solid, impermeable electrodes of the classical instruments with screens or porous electrodes, and the sheath flow parallel to the electrodes with a cross flow that enters through one permeable electrode and exits through the second permeable electrode [4,5]. While the geometry of this opposed-migration aerosol classifier differs from that of the conventional, co-flow DMA, this new form of DMA separates charged particles according to their migration through a particle-free gas through the action of an applied electric field. Because the charged particles are not confined to a small fraction of the space between the electrodes, this cross-flow (or opposed migration) DMA attains its full ability to resolve differences in mobility at lower voltages than the co-flow DMA, allowing it to operate over a wider range of voltages and to measure a wider range of particle sizes than prior instruments.

The focus of instrument developments over the 4 decades since the DMA was first commercialized about 1975 has been primarily aimed toward increasing the ability of the instrument to resolve small differences or changes in particle size distribution, and the extension of the range of sizes that can be probed to ever-smaller particles, approaching 1 nm in diameter. The result has been increasingly large, costly, and complex instruments that have served the needs for measurements of the fundamental properties of the aerosol in the laboratory, and in the field. Examples of such applications include the measurement of the aerosol yield in laboratory studies of photochemical production of secondary organic aerosols, measurements of the initial formation and growth of molecular clusters as particles are formed directly from vapor-phase precursors, studies of nanoparticle production in the development of processes for new nanotechnologies, and, especially, measurements of particles in the ambient atmosphere, the workplace, and indoor air.

Present instruments provide valuable data, but there is a growing need for measurements to be made in scenarios for which the large, complex, and costly instruments are ill-suited. The present disclosure satisfies this need.

SUMMARY OF THE INVENTION

The present disclosure describes a differential mobility analyzer (DMA) comprising a first housing connected to a second housing. The first housing has a first surface and a second surface on opposite sides of the first housing. The first housing (1) houses a first electrode (e.g., having a circular surface area) on the first surface, (2) includes a first inlet in the second surface, (3) includes a first annular channel having a base including a plurality of holes, and (4) includes a plurality of curved channels in the second surface. The plurality of curved channels have equal length and connect the first inlet to the first annular channel. The second housing houses a second electrode and typically has a second circular surface area.

The DMA further includes a chamber between the first housing and the second housing, the chamber having a first wall including the first electrode and a second wall including the second electrode so that the first electrode is facing the second electrode.

Aerosol particle and sheath flows are inputted into the chamber from the first and second inlets, respectively, are distributed through curved channels to different sections of the first and second annular channels, and are further distributed around the azimuth of the classifier through a plurality of holes so as to impinge on each another and enter the chamber as opposing flows. Charged particles in the chamber are driven by an electric field applied between the first electrode and the second electrode, such that some follow along trajectories leading towards a central outlet in the first housing or the second housing.

The first annular channel and the second annular channel each have radial symmetry about an axis passing through the center of the first housing, the center of the second housing, a center of the first circular area, a center of the second circular area, and a center of the outlet. The first inlet is offset from the axis.

The DMA can be embodied in many ways including, but not limited to, the following.

1. The DMA chamber includes an input region connected to the first annular channel and the second annular channel so that the particle and sheath flows enter the chamber through the input region, the second wall includes an electrostatically dissipative material between the input region to the chamber and the second electrode, and the electrostatically dissipative material comprises a thickness that tapers towards the input region so that a spacing between the first wall and the second wall is gradually reduced in a diffuser region of the chamber interfacing with the input region. The first electrode comprises a ground electrode and the second electrode is biased at a potential difference with respect to the ground electrode so as to form the electric field, or the second electrode comprises a ground electrode and the first electrode is biased at a potential difference with respect to the ground electrode so as to form the electric field.

2. The DMA of example 1, wherein the electrostatically dissipative material has a surface resistivity in a range of $10^6$-$10^{12}$ $\Omega/cm^2$.

3. The DMA of one or any combination of the previous embodiments, wherein the input region includes a first input channel that interfaces a flow of the charged particles exiting from the holes with the sheath flow from the second annular channel, so that the sheath flow and the charged particles impinge on each other in a direction parallel to the radial symmetry axis prior to moving sideways/radially and entering a classification region of the chamber.

4. The DMA of one or any combination of the previous embodiments, wherein the tapered electrostatically dissipative material allows formation of the electric field in the tapered input region so that the electric field has a strong effect on the trajectories of the charged particle trajectories so that an effective radius of the classification region is increased beyond the physical dimensions of the classification region and moves concentration of the electric field away from the input region; and the tapered electrostatically dissipative material allows for a rapid dissipation of the electric field after removal of the higher non-ground voltage so as to minimize or reduce memory effects.

5. The DMA of one or any combination of the previous embodiments, wherein the high voltage electrode has a curved edge to minimize field concentration at an interface with the electrostatically dissipative material.

6. The DMA of one or any combination of the previous embodiments wherein the holes are uniformly or non-uniformly distributed around the first or second annular channels, the curved channels each include bends having an inner radius curvature that is at least twice a width of the curved channel, and the curved channels have uniform widths.

7. The DMA of one or any combination of the previous embodiments, wherein the holes and the curved channels are distributed so that a transit time for 90% of the charged particles traveling from the entrance to the first annular channel (from the outlets of the curved channels) to the central outlet is within 30% of a median residence time, wherein the median residence time is the transit time for 50% of those charged particles that are transmitted to the central outlet.

8. The DMA of one or any combination of the previous embodiments, further including a first mechanism connected to the first inlet and a second mechanism connected to a second inlet to the second annular channel, wherein the first mechanism and the second mechanism control flows of the particles and the sheath flow, respectively so that the flow of particles into the first inlet is 0.3 L/min or less, the sheath flow into the second inlet is 1.2 L/min or less, and the DMA operates with a resolution $R_{ND}$<4.

9. The DMA of one or any combination of the previous embodiments, wherein the curved channels and holes are disposed so that mean residence time of the charged particles in the classification region is less than 2 seconds and the electric field is ramped from $10^3$ to $10^6$ volts per meter in less than 60 seconds.

11. The DMA of one or any combination of the previous embodiments, wherein the first electrode and the second electrode each include a screen or porous electrode, and the sheath flow is a cross flow that enters through one of the porous electrodes and exits through the other of the porous electrodes.

12. The DMA of one or any combination of the previous embodiments, wherein the curved channels include a plurality of branches.

13. The DMA of one or any combination of the previous embodiments, wherein curved channels distribute a flow of particles through equal pressure drops between the first inlet and the first annular channel.

14. The DMA of one or any combination of the previous embodiments, wherein the second housing includes curved channels as in the DMA of embodiment 13 that distribute the sheath flow to a second annular channel, and the sheath flow is inputted into the chamber through the second annular channel.

15. The DMA of embodiment 14, wherein the second annular channel comprises a porous or screen material in communication with the chamber and the sheath flow enters the chamber through pores in the porous material.

The present disclosure further describes a housing for an electrode in a differential mobility analyzer (DMA), comprising a first surface and a second surface on opposite sides of the housing, the first surface for housing an electrode; an inlet in the second surface offset from a central axis of the housing; an annular channel having a base including a plurality of holes; and a plurality of curved channels in the second surface, the plurality of curved channels having equal length and connecting the inlet to the annular channel. The inlet is for sheath flow or aerosol flow. The electrode is a ground electrode or an electrode for applying a voltage with respect to a ground electrode.

The present disclosure further describes a housing for an electrode in a differential mobility analyzer (DMA), comprising a wall for a chamber including a classification region, wherein the electrode is housed in the wall and a voltage applied to the electrode with respect to a ground electrode is used to classify charged particles in a classification region of the chamber; and an input for inputting sheath flow or particles into the chamber, wherein the wall includes an electrostatically dissipative material having a tapered thickness between the input and the classification region, so that the wall slopes between the inlet and the classification region and increases a width of the chamber in the classification region as compared to at the input. In one or more examples, the electrostatically dissipative material has a surface resistivity in a range of $10^6$-$10^{12}$ $\Omega/cm^2$.

BRIEF DESCRIPTION OF THE DRAWINGS

Referring now to the drawings in which like reference numbers represent corresponding parts throughout:

FIG. 1A illustrates a cross-section of a radial DMA wherein the incoming aerosol sample enters tangentially. FIGS. 1B, 1C, and 1D are side, top, and perspective views of simulation results demonstrating that, for the flow rates simulated, the flow is not distributed uniformly around the azimuth of the radial DMA (i.e., there is azimuthal asymmetry), causing variation of the flow of aerosol particles around the slot formed by the fillet at the inner-top of the racetrack, and the knife edge primarily in the vicinity of the tangential entry port and degrading the ability of the DMA to separate particles of different mobilities.

FIGS. 2A and 2B illustrate a first and second surface of a first housing for a ground electrode in a DMA of this invention, according to one or more embodiments.

FIGS. 7A and 7B illustrate distribution of the aerosol or sheath flows using curved channels and an array of 0.5 mm holes.

FIG. 13A: 90 s scan time; FIG. 13B: 10 s scan time.

FIG. 16A is a section view showing the vertical component of fluid flow velocity, $u_z$. Lines show fluid flow velocity streamlines that originate from the cross-flow inlet, and are truncated at the converging region near the aerosol outlet for clarity. Note that the vertical velocity increases approaching the centered aerosol outlet. Dashed lines $z_1$ and $z_2$ mark sections corresponding to those in FIG. 16B. FIG. 16B is an overhead view showing the non-vertical component of fluid flow velocity, $u^2_x + u^2_y$. Dashed circles $z_1$ and $z_2$ correspond to the cut planes in FIG. 16A. The white ring between $z_1$ and $z_2$ indicates the absence of data, not zero velocity. Note that the non-vertical velocity increases approaching the centered aerosol outlet. FIG. 16C is a section view showing the normalized electric potential solution. Lines show electric field streamlines that originate from the high voltage electrode surface. FIG. 16D is a section view showing the particle concentration solution at a voltage corresponding to Z.

FIGS. 17A-17B are additional schematics of the radial cross-flow DMA that can include the curved channel distribution network according to one or more examples described herein.

FIG. 19B shows the size distribution recovered at representative values of $R_{ND}$ at noon, the peak of the nucleation burst. FIG. 18C shows the biases obtained for different values of $R_{ND}$.

DETAILED DESCRIPTION OF THE INVENTION

Figure 1A:
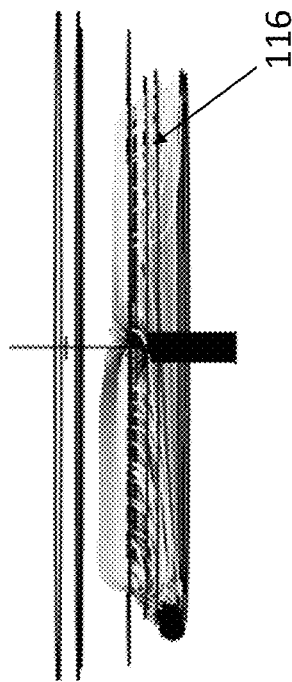
FIGS. 1A-1D. Simulations of flow trajectories within a radial DMA of the prior art that employs a tangential racetrack inlet that has been used to introduce aerosols into DMAs of a number of designs, both in cylindrical, axial-flow DMAs and in radial-flow DMAs.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

1. Introduction

A number of efforts have been made to simplify instrument design over the years. Several geometries have been examined. While most present-day DMAs classify particles using electrodes that are coaxial cylinders [7-9], the earliest DMA classified particles by migration between parallel-plate electrodes [10]. A compact DMA for measurement of high mobility (i.e., small) particles employed radial flow between parallel disk electrodes [6]. These different geometries allow similar quality of mobility classification if several constraints are met:

1. The flow between the electrodes must be laminar and stable.
2. The incoming aerosol sample and sheath flows must be uniform over the entire port through which particles enter the classification region.
3. The classified sample extraction must uniformly sample the flow near the counter-electrode at the downstream sample extraction location.

Several of the early DMAs used flow through a long, narrow gap between parallel plates or coaxial cylinders to satisfy condition (2) by introducing sufficient pressure drop to overcome any maldistribution that might result from non-uniform flows within a plenum upstream of this pressure drop element [7,8,10,11]. Pressure drop through a short, but very narrow gap was used to minimize diffusional losses of very small (sub-5 nm) particles in the design of Winklmayr et al. [9]. In order to ensure that the particles were uniformly distributed over the entire length of that azimuthal slot, the aerosol was introduced tangentially into a "racetrack" that supplied sample to the aerosol entrance. This tangential-flow, racetrack design was employed in the radial DMA (RDMA) [6].

A theoretical analysis of the ideal RDMA reveals that the mobility of those particles that are transmitted through the RDMA is $$Z_p^* = \frac{(Q_{sh} + Q_{ex})b}{2\pi(R_2^2 - R_1^2)V} \qquad (1)$$

where b is the distance between the disk electrodes, V is the applied voltage, and $R_2$ and $R_1$ are the radii of the aerosol entrance slot and the central classified aerosol outlet port, respectively. The four flows entering the DMA must be controlled with precision. The sheath and excess flows are often controlled using pumps that operate in steady-state in concert with proportional-flow control valves or mass-flow controllers. Alternatively, the excess air flow can be passed through a filter, and then recirculated into the sheath air inlet. The aerosol sample flow is generally not passed through a valve because that would lead to losses that would vary according to the valve setting. Instead, the aerosol inlet and classified sample outlet flows are monitored, and controlled with a critical orifice, valve, or other mechanism downstream of the particle detector. For large, non-diffusive particles that are classified at voltages in excess of about 100 V, and with good flow control, the mobility transmitted through the original RDMA agreed with this prediction within a few percent. The resolution was, however, lower than predicted. This discrepancy was initially attributed to imperfect concentricity of the aerosol entrance slot.

Figure 1B:
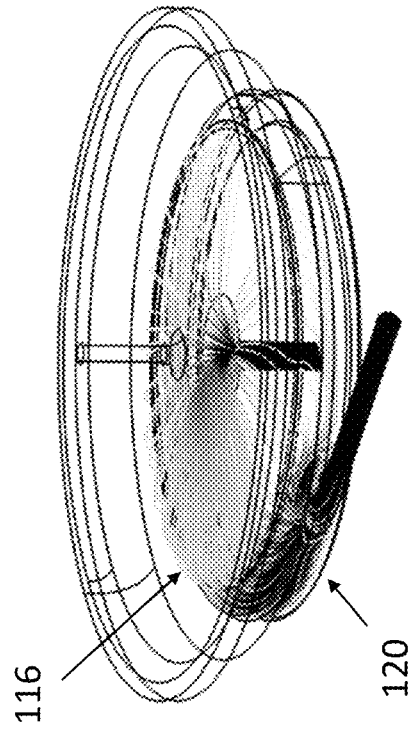
Figure 1C:
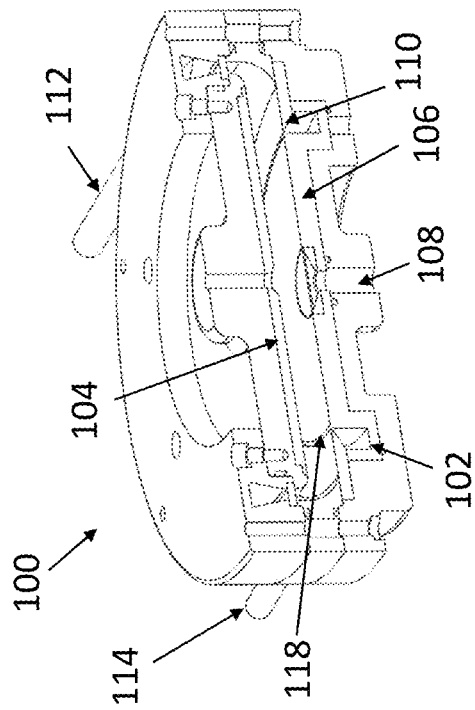
Figure 1D:
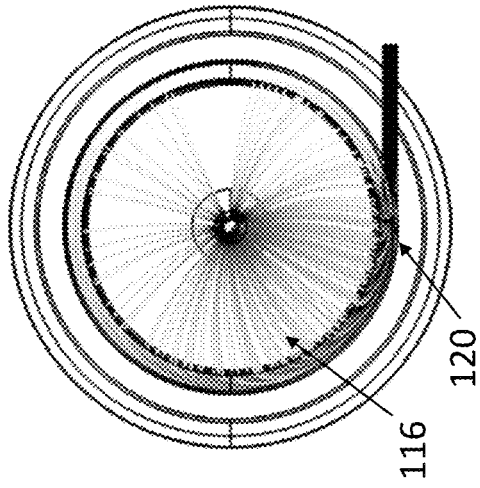

Recent efforts to design a smaller version of the RDMA revealed a second problem in the tangential inlet design. Simulations of the RDMA were undertaken using COMSOL Multiphysics™ computational fluid dynamics to model the flow within the tangential racetrack 102 of an RMDA 100 comprising a sample flow inlet 114, high voltage electrode 104, ground electrode 106, excess flow outlet 108, knife edge 110, and sheath flow inlet 112. FIGS. 1B, 1C, and 1D are side, top, and perspective views of simulation results demonstrating that, for the flow rates simulated, the sample flow 116 is not distributed uniformly around the azimuth of the RDMA 100 (i.e., there is azimuthal asymmetry), but rather enters through the slot formed by the fillet at the inner-top of the racetrack 102 and the knife edge 110, primarily in the vicinity of the tangential entry port 120. These results reveal that the pressure drop through the annular gap 118 at the outlet of the racetrack was insufficient to ensure azimuthal symmetry of the incoming aerosol flow. This problem was exacerbated by the small aerosol sample flow that is required to attain the broad sizing range (10-500 nm) for which this embodiment of the invention was designed. This small pressure drop allowed most of the sample flow to enter the gap between the electrodes relatively close to the outlet 120 of the tangential inlet tube. Indeed, some of the inlet sample flow diffused in the direction opposite to the tangential flow. The resulting maldistribution of the sample flow within the classification region effectively reduces the flow rate ratio and, thereby, resolution RNA of the instrument. A surprising and unexpectedly new approach to the design of the RDMA that allows the RDMA to achieve its full potential resolving power is detailed in the following sections.

2. Example RDMA Structure and Operation

The RDMA described herein differs substantially from prior designs in the design of the aerosol and sheath flow inlets.

FIGS. 2A and 2B illustrate a first housing 200 for a first electrode 202 (in this case, a ground electrode) in a DMA. The first housing 200 comprises a first surface 204 and a second surface 206. The first electrode 202 is housed on the first surface 204. The housing 200 further includes an inlet 208 in the second surface 206; an annular channel 212, a plurality of curved channels 218 in the second surface 206; and a plurality of holes 216. The plurality of curved channels 218 have equal length and connect the inlet 208 to the annular channel 212. The first housing 200 further includes an outlet 220 for the excess sheath flow and a first flange 222 including first bolt holes 224 for connecting to a second housing.

Figure 3:
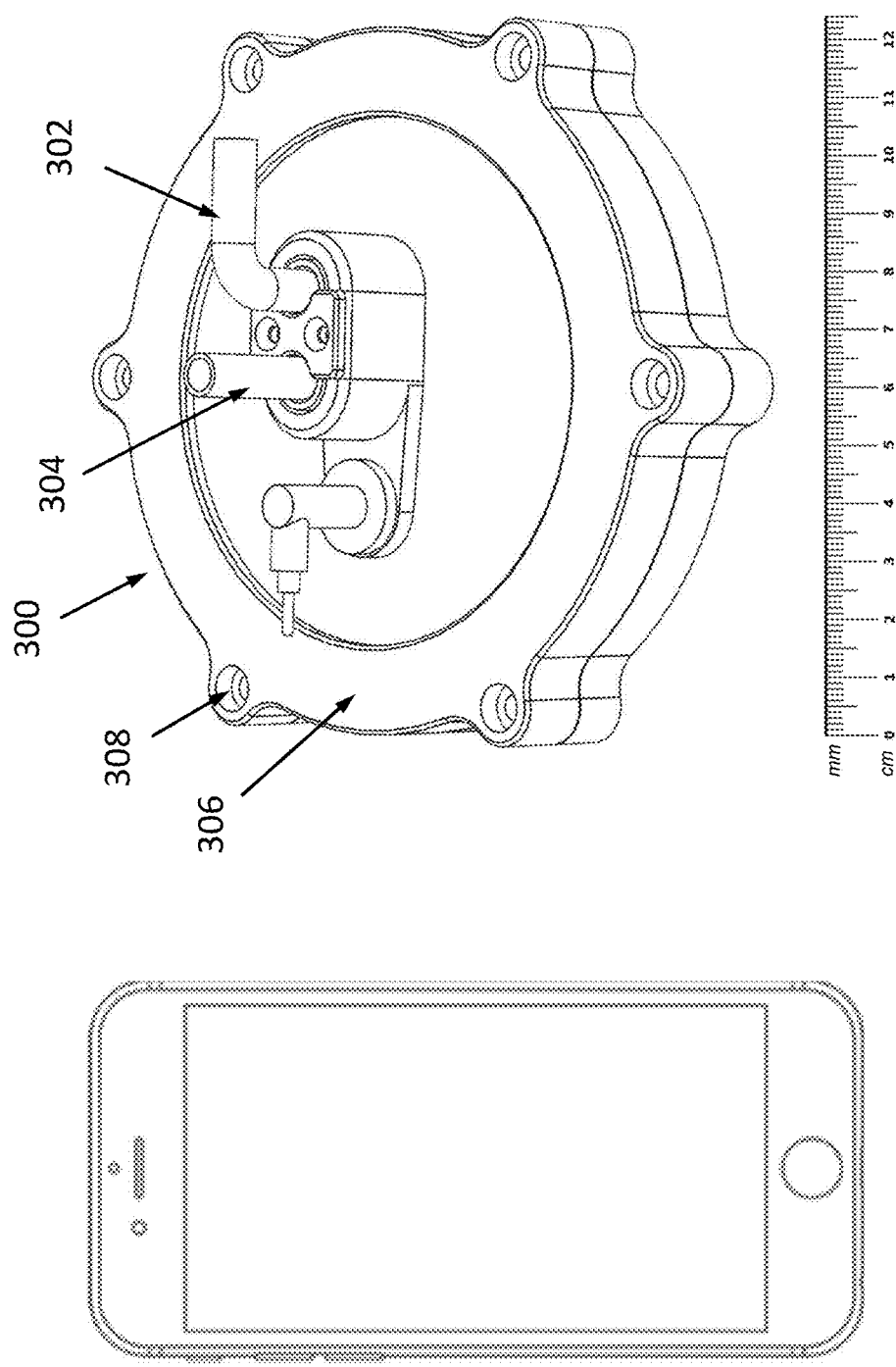
FIG. 3 illustrates a second housing for a high voltage electrode in the DMA, coupled to the first housing, according to one or more embodiments wherein the sizing relative to a smart phone is shown.

FIG. 3 illustrates a second housing 300 for a second electrode (higher voltage (either positive or negative) electrode, non-ground electrode). The second housing 300 further includes an inlet 302 for the sheath flow, an outlet 304 for the classified aerosol flow, and a second flange 306 including second bolt holes 308 for connecting with the first housing 200. While the illustrated embodiment employs bolts for connecting the first flange 222 to the second flange 306, other fastening mechanisms, including the use of adhesives, are included under the scope of the present invention. In addition, although the first and second housings are illustrated here as separate housing for the electrodes, in other examples the first housing and second housing are integrated in a single part (that could be, for example, manufactured using three-dimensional printing). In one or more examples, as used herein, a housing is defined as a part used to house an electrode.

In various examples, the conductive surfaces (electrodes) could be produced by vapor deposition or painting of conductive material on the surfaces of a polymeric material. DMAs have been made by painting a conductive coating (metal or conductive polymer).

Thus, as illustrated herein, one of the housings 300 has an inlet 302 for the sheath flow, and the other housing 200 includes an inlet 208 for the aerosol flow. The aerosol flow and sheath flow can be inputted through either the housing for the high voltage electrode or through the housing for the ground electrode. In the examples illustrated herein, the backside of the housing inputting the aerosol flow (which necessarily includes charged particles, but may also include uncharged ones) includes the curved channel network illustrated in FIG. 2A. The backside of the housing inputting the sheath flow also includes a curved channel network.

Figure 4B:
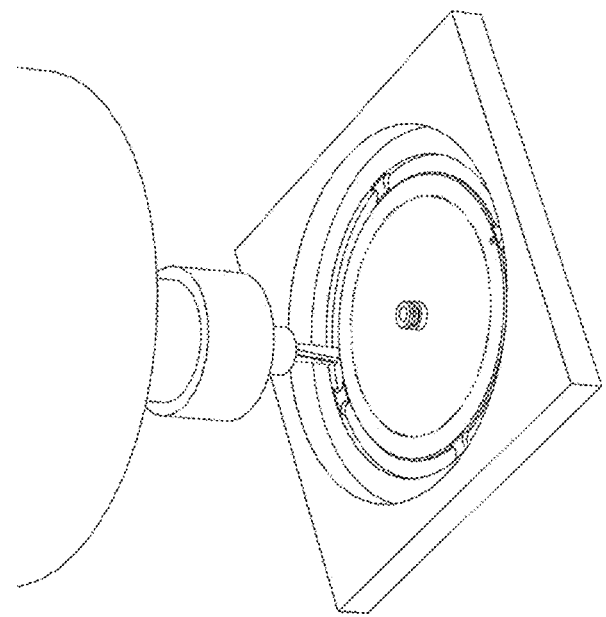
FIGS. 4A and 4B illustrate manufacturing of the second housing and first housing, respectively.
Figure 4A:
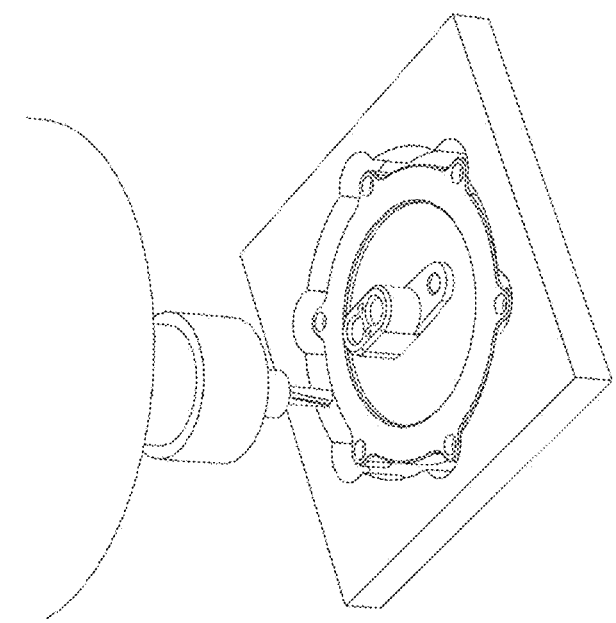

FIGS. 4A-4B illustrate a method of making the second housing 300 and first housing 200, respectively, using a milling machine. Alternate methods, including additive manufacturing techniques (3D printing), injection molding, embossing, die casting, powder sintering, or other technologies that enable production of the shapes or first and/or second housings described herein may be used to fabricate the described instrument.

Figure 5:
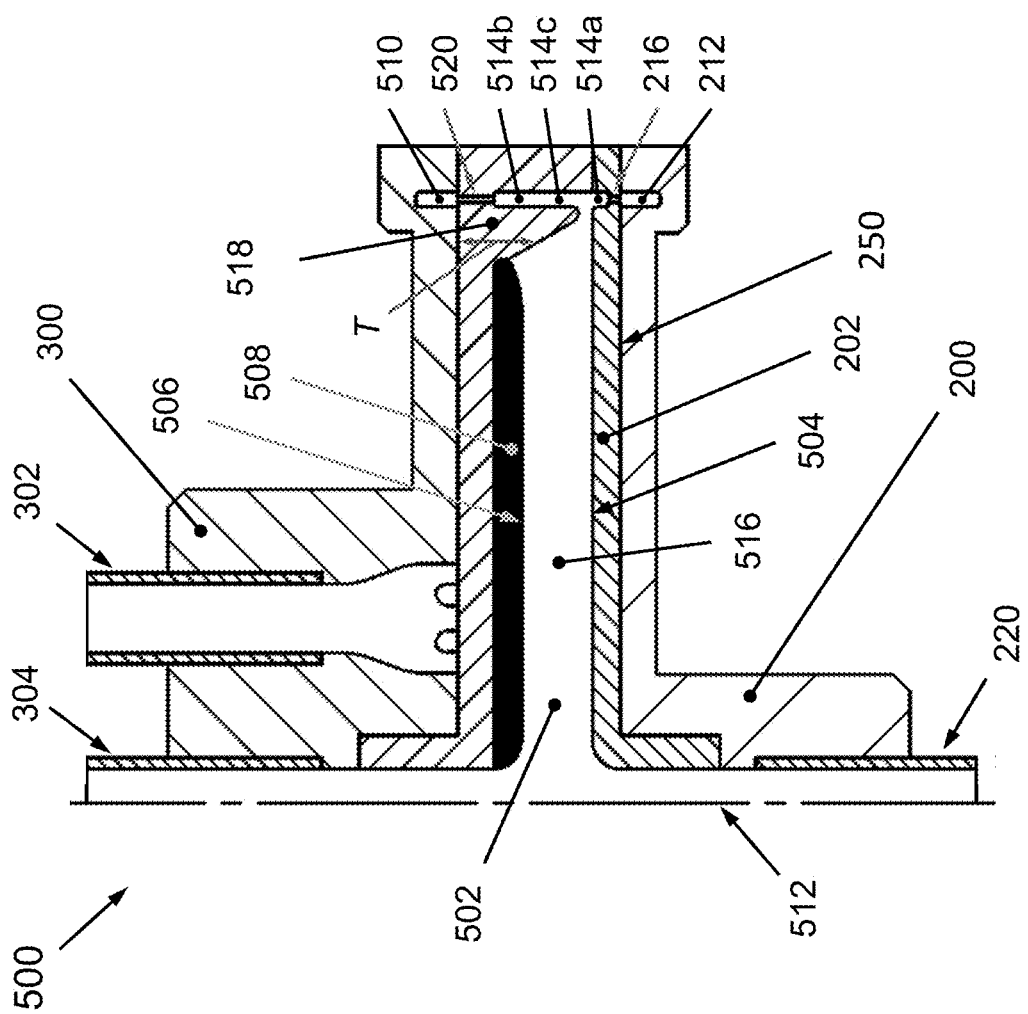
FIG. 5 is a cross-sectional schematic of a DMA including the first housing and the second housing, according to one or more embodiments.

FIG. 5 is a partial cross-sectional view illustrating the DMA 500 comprising the first housing 200 connected to the second housing 300 (e.g., by fastening together the first flange 222 and the second flange 306 using bolts passing through the first bolt holes 224 and the second bolt holes 308). A chamber 502 is enclosed between the first housing and the second housing, the chamber 502 having a first wall 504 including the first electrode 202 and a second wall 506 including the second electrode 508 so that the first electrode 202 faces the second electrode 508. Also shown is an inlet 302 in the second housing 300 for inputting sheath flow to the chamber 502.

In one or more examples, the first housing 200 and the second housing 300 are operatively connected so that:

(1) The first annular channel 212 and the second annular channel 510 each have radial symmetry about an axis 512 passing through the center of the first housing 200, the center of the second housing 300, a center of the first circular area of the first electrode 202, a center of the second circular area of the second electrode 508, and a center of the outlets 220, 304;

(2) The inlets 208, 302 to the chamber 502 from the first housing 200 and second housing 300, respectively, are offset from the axis 512;

(3) Sheath flow can be inputted into the chamber 502 through the second annular channel 510, and charged particles inputted into the first inlet 208 to the first housing 200 are distributed through the curved channels 218 to different sections of the first annular channel 212;

(4) The charged particles in the first annular channel 212 are distributed through the plurality of holes 216 into the chamber 502 so as to impinge on the opposing sheath flow outputted from the second inlet (e.g., the second annular channel 510); and (5) The charged particles in the chamber 502 are driven, by an electric field applied between the first electrode 202 and the second electrode 508, along trajectories leading towards an outlet 220, 304 in the first housing 200 and/or the second housing 300.

FIG. 5 further illustrates the chamber 502 includes an input region 514 interfacing the flow from the first annular channel 212 with the flow in the second annular channel 510 from the second housing 300. The input region 514 includes input channels 514a and 514b (e.g., annular input channels) that interface the aerosol flow exiting from holes 216 in the first annular channel 212 with the sheath flow exiting from holes 520 in the second annular channel 510. Thus holes 216 output the aerosol flow into input channel 514a, and holes 520 input the sheath flow into input channel 514b, so that sheath flow and aerosol flow impinge on each other with a component of the flow in a direction parallel to axis 512 prior to the aerosol and sheath flows moving radially and entering the classification region 516 of the chamber 502.

FIG. 5 further illustrates the second wall 506 of the chamber 502 includes an electrostatically dissipative material 518 between the input region 514 and the second electrode 508. The electrostatically dissipative material 518 comprises a thickness T that tapers in the direction towards the input region 514 so that a spacing between the first wall 504 and the second wall 506 is gradually reduced in a region of the chamber 502 interfacing with the input region 514.

Figure 6:
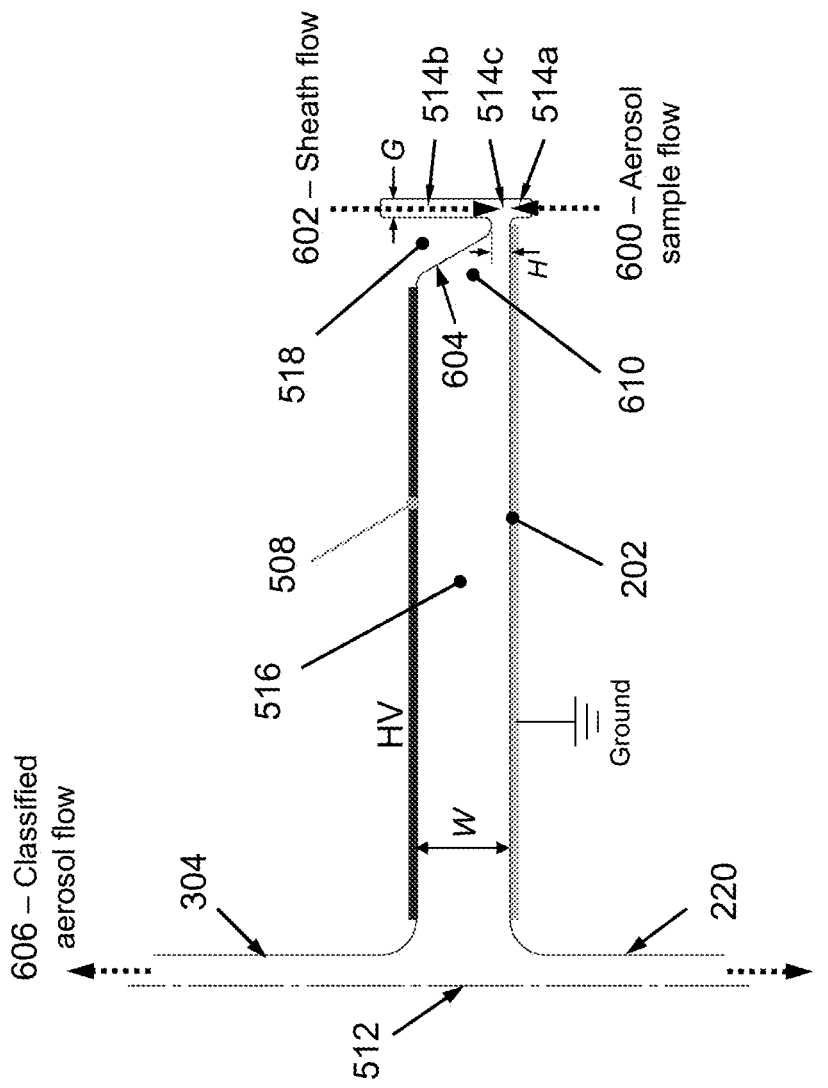
FIG. 6 is a cross sectional schematic of the DMA classification region geometry and key design features, according to one or more embodiments.

FIG. 6 illustrates the input region 514 in further detail, including the input channels 514a, 514b having a width G (e.g., 1 mm) and the input region 514 including a region 514c where the aerosol flow 600 (exiting the input channel 514a) meets the sheath flow 602 (exiting input channel 514b) traveling in the opposite direction parallel to axis 512. In the example shown, the region 514c where the flows meet has a height H of 1 mm. FIG. 6 further illustrates tapering of the electrostatically dissipative material 518 leads to a sloped portion 604 of the second wall 506 so that a width W of the chamber (or spacing between the walls 504, 506) is reduced in the interface region 610 of the chamber 502 interfacing with the input region 514c. Aerosol flows and sheath flows exiting input region 514c flow into the classification region 516 and then out through outlets 304, 220 as classified aerosol flow 606 and excess sheath flow 608, respectively.

In the illustrated examples, the first electrode 202 comprises a ground electrode and the second electrode 508 is biased at a potential difference with respect to the ground electrode so as to form the electric field applied to the aerosol flow in the classification region 516.

Various novel features of the DMA apparatus are further described in the following sections and with reference to FIGS. 2-9.

3. Sheath Flow and Aerosol Flow Impingement

In one or more examples, a critical aspect of the design is the way that the aerosol flow 600 and sheath flow 602 are introduced to the chamber 502 to ensure good separation of the incoming aerosol flow 600 from the incoming particle-free sheath flow 602 while also ensuring laminar flow and a uniform distribution of the two flows 600, 602, around the center of the electrode disks 202, 508.

FIG. 6 illustrates these necessary conditions for classification are attained by introducing the sheath flow 602 and aerosol streams/flow 600 in direct opposition to one another to produce a stagnation surface that separates the two flows 602, 600, while maintaining laminar flow. The two flows 600, 602 impinge on one another within an annular gap G of about 1 mm height H and about 1 mm width, thereby minimizing delays associated with the formation of boundary layers near the confining walls of the chamber 502. Reducing the boundary layer effects narrows the residence time distribution within the classification region 516.

4. Azimuthal Flow Distribution

To attain a desired predicted resolving power of the classifier, the aerosol flow 600 and sheath flow 602 must each be uniformly distributed azimuthally around the center of the disk electrodes 202, 508. As described above, conventional designs have attempted to attain this uniformity using a laminar flow pressure drop through a narrow annular slot 118 (see FIG. 1A), either the long channel employed in the cylindrical DMA, or using a much smaller slot between a fillet on the aerosol entrance channel and a shallow fillet that defines a narrow gap relative to the curved surface. This approach may suffice for high sample flow rates, but fails to produce a uniform flow as the size of the instrument is reduced owing to the need to simultaneously reduce flow rates in order to maintain the sizing range. This uniform distribution is accomplished in the instrument illustrated herein by a two-stage process:

First, the aerosol sample flow 600 is introduced to a flow-distribution plenum 208 connected to the back side 250 of the electrode disk 202, i.e., on the side opposite to that of the classification channel or chamber 502 (referring to FIGS. 2A, 5 and 6). In one embodiment, the aerosol sample flow 600 enters the RDMA 500 on the side of the grounded electrode 202, although in other embodiments the aerosol flow 600 could be introduced on back side of the electrode 508 to which the classification voltage is supplied. Because the preferred locations for the outlet port 304 (for the classified aerosol flow 606) and the outlet port 220 (for the sheath exhaust flow 608) are at the center of the respective electrodes 508, 202, the entrance ports 208, 302 for the two flows 600, 602 are offset from the center of the respective electrodes 508, 202.

Figure 8B:
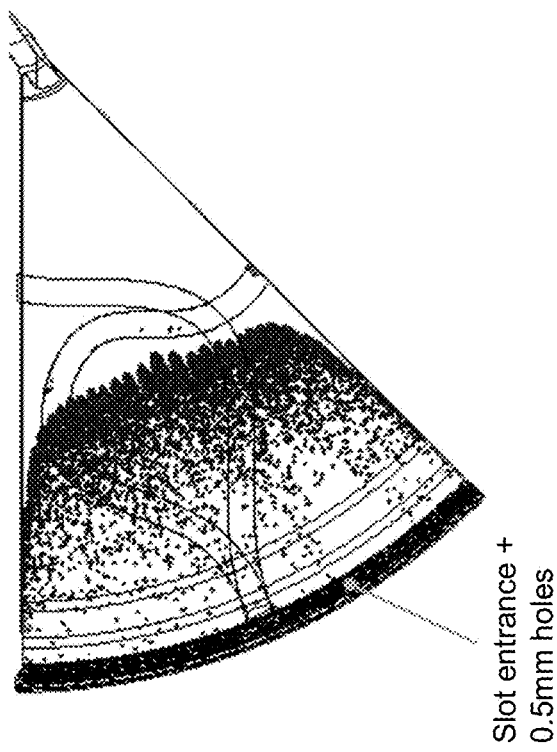
FIGS. 8A and 8B illustrate a comparison between the time delays in a configuration with only the slot entrance (FIG. 8A) and with the 0.5 mm holes (FIG. 8B).
Figure 8A:
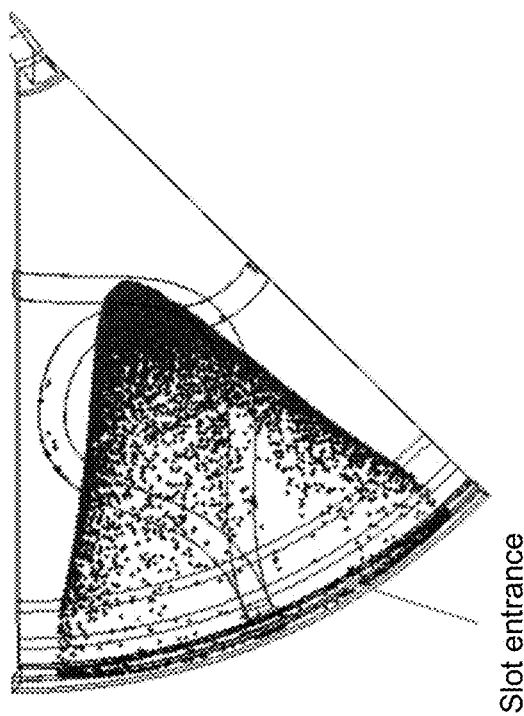
Figure 9:
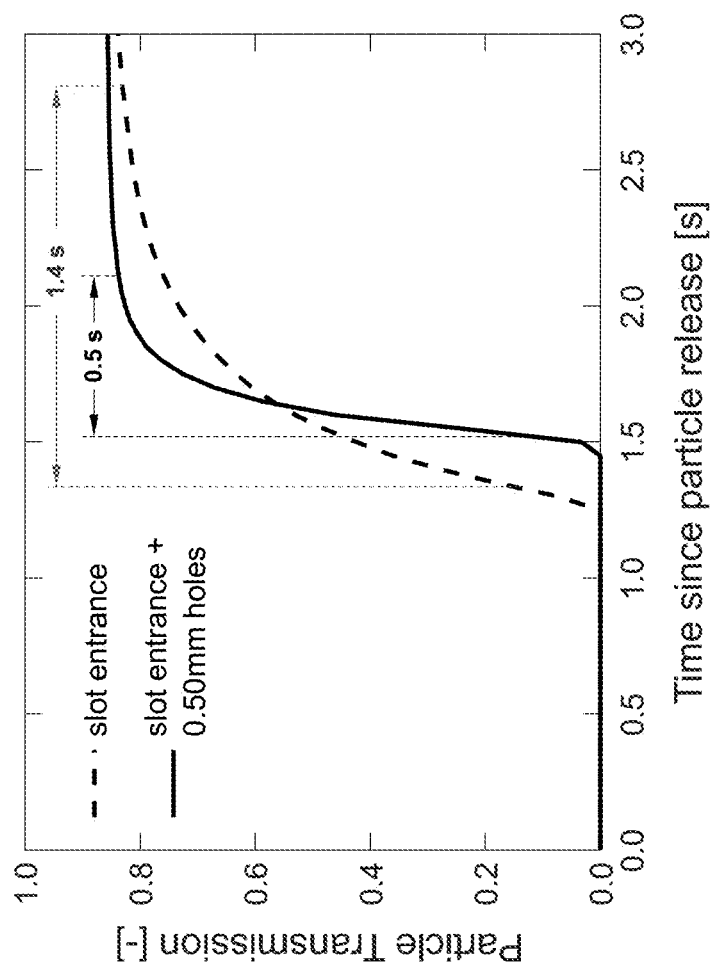
FIG. 9: Comparison between the time response of the DMA with the slot entrance and the DMA having a geometry with 0.5 mm holes. The DMA with the holes results in short time response, and hence facilitates fast voltage scanning DMA operation.

(ii) FIGS. 7A and 7B illustrate the backside of an electrode housing (e.g., housing 200 or 300). The flow 700 discharges from a plenum 708 through a number (e.g., 8) of smaller channels 704 in order to deliver equal flows into a narrow (e.g., 1 mm wide) annular slot (annular channel 712) at the perimeter of the classification region. In order to ensure equal flows to each of the small channels 704, the flow 700 enters the plenum 708 in a way that minimizes potential biases to the flow direction. The flow 700 is introduced orthogonal to the electrode surface so that dynamic pressure effects do not bias the division of flow amongst the plurality of channels 704. To ensure equal flows through the different channels 704, the channels 704 are gently curved and, in one or more examples, of equal length (as illustrated in FIG. 7A). The gentle curvature of the channels 704 is particularly important for the aerosol sample introduction as it minimizes aerosol particle losses within these channels 704. The channels 704 emanating from the off-axis plenum 708 deliver the flow 700 to a narrow (1 mm wide) circular channel 712. To distribute the flow 700 uniformly into the space between the nearest curved channel outlets, an additional pressure drop is required. This pressure drop is provided by an array of holes 716 (e.g., having a diameter of 0.5 mm), positioned at the center of the entrance slot 712. In various examples, the spacing between the holes 716 is optimized such that the aerosol particles are distributed uniformly in both space and time domains (FIGS. 8B and 9). Uniform distribution in the time domain is particularly important to facilitate fast voltage scanning operation, hence reducing the time necessary between sample intervals. The holes 716 discharge the flow 700 into a second, narrow (e.g., 1 mm) channel (e.g., 514a or 514b) to allow the relatively high velocity flow from the jet to dissipate and, thereby, to approach azimuthal uniformity before entering the region 514c where the aerosol flow 600 impinges against the opposing sheath flow 602. While the present embodiment comprises channels connected on a back side of each electrode that are sealed with a separate flange, gently-curved channels could be fabricated by methods such as additive manufacturing (3D printing) that would allow said channels to be incorporated into a single part and, thereby, reduce the complexity of the final assembly.

In various examples, the geometry for the sheath air flow entrance 602 and distribution is similar to that described for the aerosol sample inlet flow 600. The sheath flow is introduced into a plenum and distributed through a plurality (e.g., 8) of channels that are designed to distribute the flow equally into the same plurality of exits in an azimuthal channel 510. Based upon experimental observations and computational fluid dynamics simulations, holes 520 can be drilled at the exit to the annular plenum 510, with an annular slot opening 514b in the space opposing the holes 216 through which the incoming aerosol flows, to minimize effects of any possible misalignment and, thereby, ensure uniformity. A positioning pin or key is integrated in the assembly to ensure alignment such that the individual holes 216 carrying the aerosol sample flow and the holes 520 carrying sheath flow directly oppose one another. Similar to the holes 216 for the aerosol flow, the holes 520 for the sheath flow are recessed within the narrow (e.g., 1 mm wide) channel 514b to allow momentum from the flows 602 exiting the small holes to dissipate before entering the impingement region 514c. However, in other examples, the inlet for the sheath flow may include alternative configurations (e.g., a porous material).

6. Electric Field Management

Figure 10B:
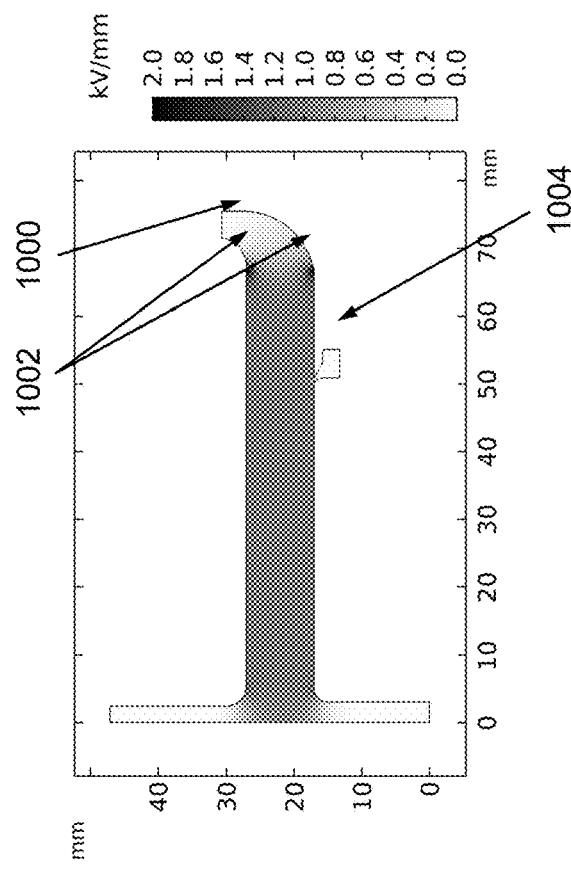
FIGS. 10A-10B. Finite element simulations of the electric field within the RDMA according to one or more embodiments of the present invention (FIG. 10A) and for the RDMA of Zhang and Flagan [6] (FIG. 10B).

An aerodynamic connection (diffuser 610) is used to achieve uniform distribution of aerosol and sheath flows and minimize boundary layer effects that would seriously distort the transit time distribution of particles within the DMA 500. The aerodynamic connection 610 (diffuser) is where the aerosol and sheath flows exit the region 514c at the outer radius where the aerosol sample and sheath flows impinge on one another (i.e., diffuser 610 is between the classification region 516 and impingement region 514c). In order to prevent arcing, the tapered material 518 forming the diffuser 610 cannot be held at the voltage of the higher voltage (non-ground) electrode 508. In a conventional radial DMA (FIG. 10B), the upward curving flow channel 1000 to the right is fabricated from Delrin, a dielectric (electrically insulating) material. However, electric field concentrations 1002 at the outer radius of both the upper and lower electrodes are located well outside the radius of the aerosol entrance racetrack 1004. Therefore, the field throughout the classification region is quite uniform outside of the central region where the flow exit ports reduce the field strength. Owing to the close proximity of this insulator to the flow containing charged particles, deposition of a fraction of said particles on said dielectric material degraded the classification over time due to the electric field created by the deposited charge. It was discovered that replacing said dielectric with an electrostatically dissipative material eliminated this effect.

Figure 10A:
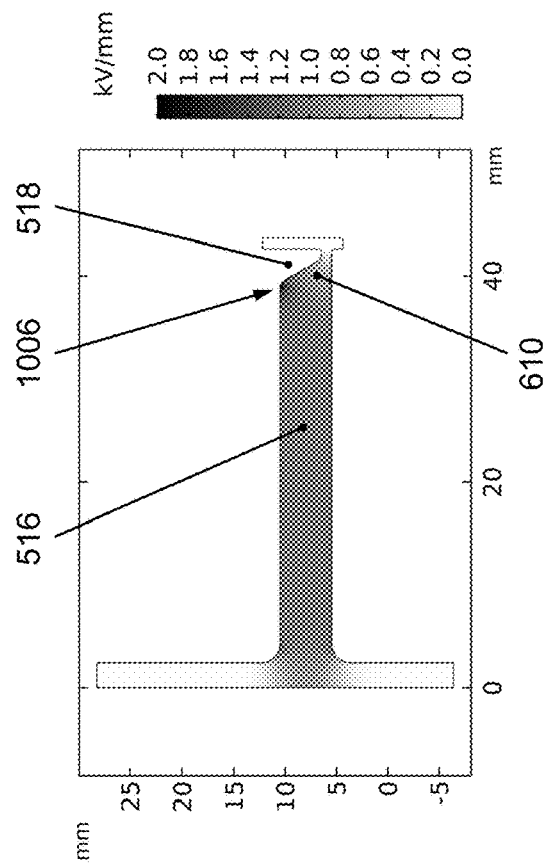

The dielectric comprising the electrostatically dissipative material 518 described herein (FIG. 10A), on the other hand, provides a sloped diffuser 610 which brings the field concentration 1006 within the classification region 516. Equation (3) provides the relationship between the voltage required to classify particles of a given mobility and the dimensions and flows of an idealized RDMA in which these perturbations to the electric field are not present. In this idealized RDMA, particles are first introduced in the classifier at a radius near or smaller than that of the electrode, where the electric field is mostly uniform and perpendicular to the electrodes. While this configuration is technically sound and has proven to be operational, it also results in a non-optimal space usage (since a relatively large fraction of the classifier volume is being occupied with no particle interaction). Moreover, the additional electrode material increases the mass of the classifier, which is detrimental to many applications such as use on remotely piloted air craft and in use as a personal exposure monitor.

Figure 11:
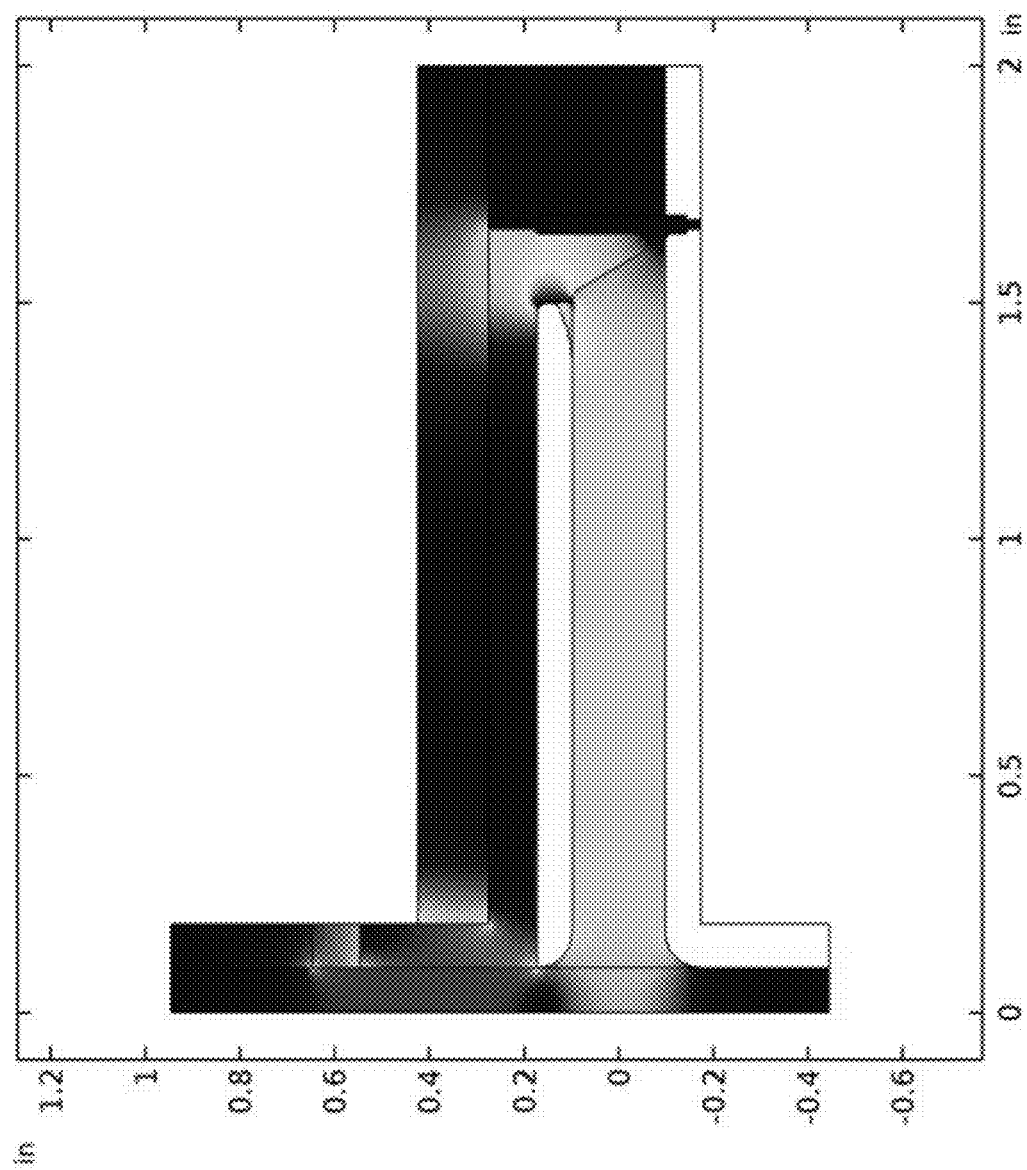
FIG. 11 shows a modified electrode design that minimizes sharp corners and both reduces the field strength associated with the material discontinuity, and removes much of the high field region from the classification region.
Figure 12:
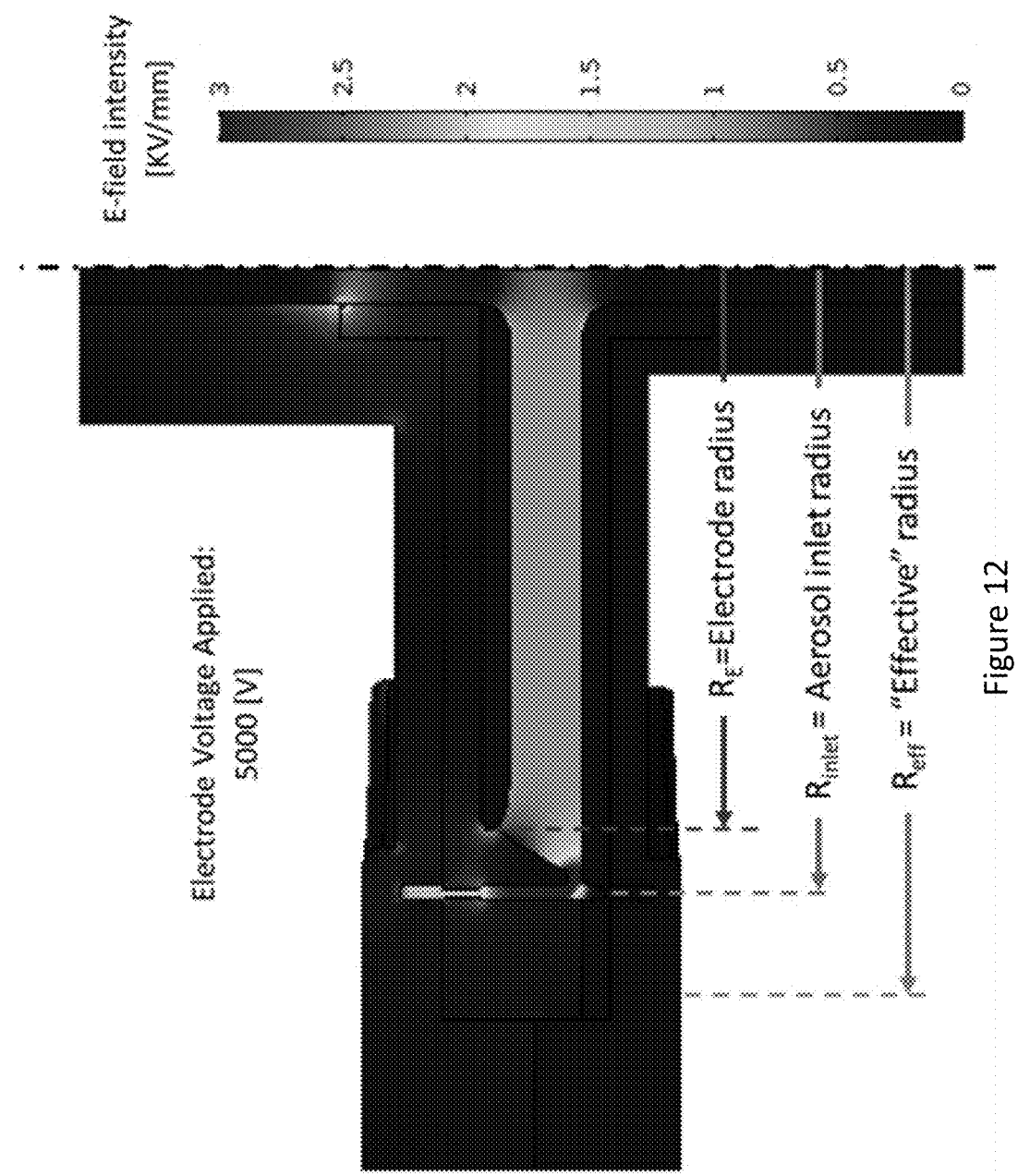
FIG. 12: Axisymmetric cross section of the simulated DMA electric field at the maximum operating voltage of 5000V. The enhanced electric field in the vicinity of the classifier inlet results in a larger "effective" classification radius. This allows for a significantly smaller classifier size for a given dynamic measurement range, compared to regular classifiers of the same type.

Replacing the entrance region dielectric material with a high (but finite) electrical resistivity material 518 (e.g., an electrostatic dissipative Delrin material with a surface resistivity of $10^{10}$ Ω/cm, as compared to the resistivity of >$10^{13}$ Ω/cm for regular Delrin), optimizes the geometry of the classifier inlet to make use of the entire classification volume. Electrostatically dissipative materials with different values of resistivity may be employed, provided the resistivity is sufficiently low to allow dissipation of any deposited change, but sufficiently high to limit the electrical current from the high voltage electrode to the ground potential. The classifier parts are designed so that particles are not only introduced in a larger radius than this of the electrode, but they are also exposed to the electrostatic field immediately as they enter the classification region 516. The effect of the field in this area is significant, because particle velocities are the lowest, and hence the resulting electrostatic forces are much more effective to generate drift trajectories to the incoming particle flow. The resulting electric field distribution is shown in FIG. 12. FIG. 11 shows a modified electrode design that minimizes sharp corners and both reduces the field strength associated with the material discontinuity, and removes much of the high field region from the classification region.

Experimental characterization of the classifier operating with a sheath flow in the 0.75-1.2 L/min range, separating highly monodisperse 150 nm and 300 nm PSL particles, showed that the "effective" inlet radius to fit the measurement data in Eq. 3 is approximately $R_{eff}$=47.6 mm, which is 12.5% to 25% higher than the actual aerosol inlet ($R_{in}$) and electrode radius ($R_E$), respectively. For given sheath flow, electrode spacing, and $R_{in}$, $R_{eff} >> R_1$, Equation (3) yields:

$$\frac{V_{eff}}{V_{in}} \cong \left(\frac{R_{in}}{R_{eff}}\right)^2 \cong 0.79 \quad (2)$$

$$\frac{V_{eff}}{V_E} \cong \left(\frac{R_E}{R_{eff}}\right)^2 \cong 0.64 \quad (3)$$

Thus, the "effective" voltage required to separate a given particle mobility is only about 80% of that corresponding to the physical classifier inlet radius, and 64% of the voltage corresponding to the high voltage electrode radius. The physical classifier inlet radius would be a close approximation to the relevant dimension describing typical radial DMA configurations, so this discovered effect enables a significant reduction in the size and weight of a DMA below that of prior art designs.

Simulation results suggest that the field intensity at the inlet region 514c is higher by a factor of about 2-3 than that in the main classification region 516, suggesting the possibility of undesired electrostatic breakdown due to the high electrostatic field. Surprisingly and unexpectedly, however, electrostatic breakdown has not been observed experimentally at voltages as high as negative 5000V.

Initial prototypes employing dielectric parts in contact with the electrodes showed history effects wherein the classification efficiency and resolving power change with time during operation owing to charge deposition and retention on said dielectric material. However, replacing the insulating parts in contact with the electrode and aerosol flow paths with parts fabricated from an electrostatic dissipative material 518 ensured rapid discharge of any accumulated charge and eliminated distortions due to resulting electric fields.

7. Example Figures of Merit and Performance

Figure 13A:
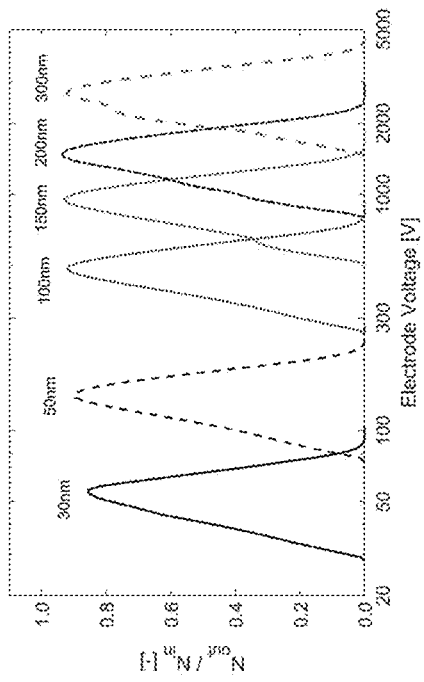
FIGS. 13A-13B: Simulation of the DMA transfer functions operating with a resolution of 2 for a 5-5000V exponential voltage ramp, with 30-300 nm particles.
Figure 13B:
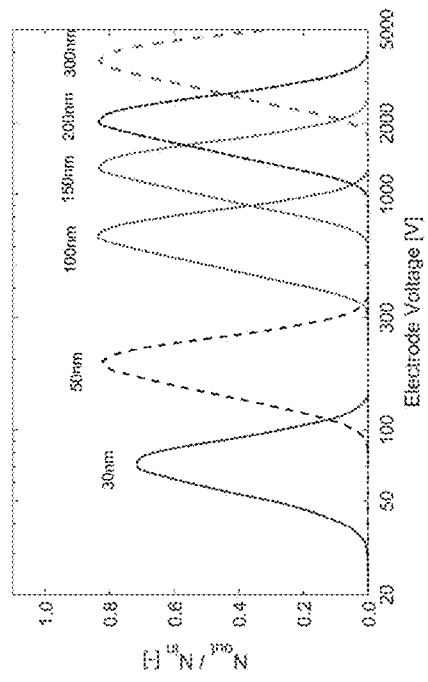

In the example DMA comprising the housings illustrated in FIGS. 2A, 2B, and 3, the outer diameter of the instrument is approximately 12 cm, with an electrode housing spacing of 5 cm (excluding tubing). Using a combination of materials including aluminum for the ground electrode disk and the grounded side of the instrument housing, delrin as an electrical insulator and for the high voltage electrode housing, and stainless steel for the high voltage electrode disk, the assembled DMA weighs approximately 350 g. A conventional DMA column with a similar sizing range weighs about 10 kg. FIG. 6 illustrates an example wherein the electrode disks are separated by 5 mm and the diameter of the electrode disks is 76.2 mm, resulting in a classification volume of 22.8 cm³ (the classification region/volume of the DMA instrument is defined as the volume between the high voltage and ground electrode disks). In one example, operating the instrument with these dimensions and with aerosol and sheath flows of 0.3 L/min and 0.6 L/min, respectively, results in a mean residence time shorter than 2 seconds (s) (e.g. 1.8 s with a standard deviation of 0.5 s) (FIG. 9). Another embodiment of the invention employs electrodes of ~5 cm diameter and aerosol and sheath flow rates of 0.1 and 0.2 L/min, respectively, to obtain size distributions in the 10-200 nm size range with a classifier weighing only 100 g. The simulation results in FIG. 13B show the DMA could be operated at scan times at least down to 10 s without significant smearing of its transfer functions.

Figure 14:
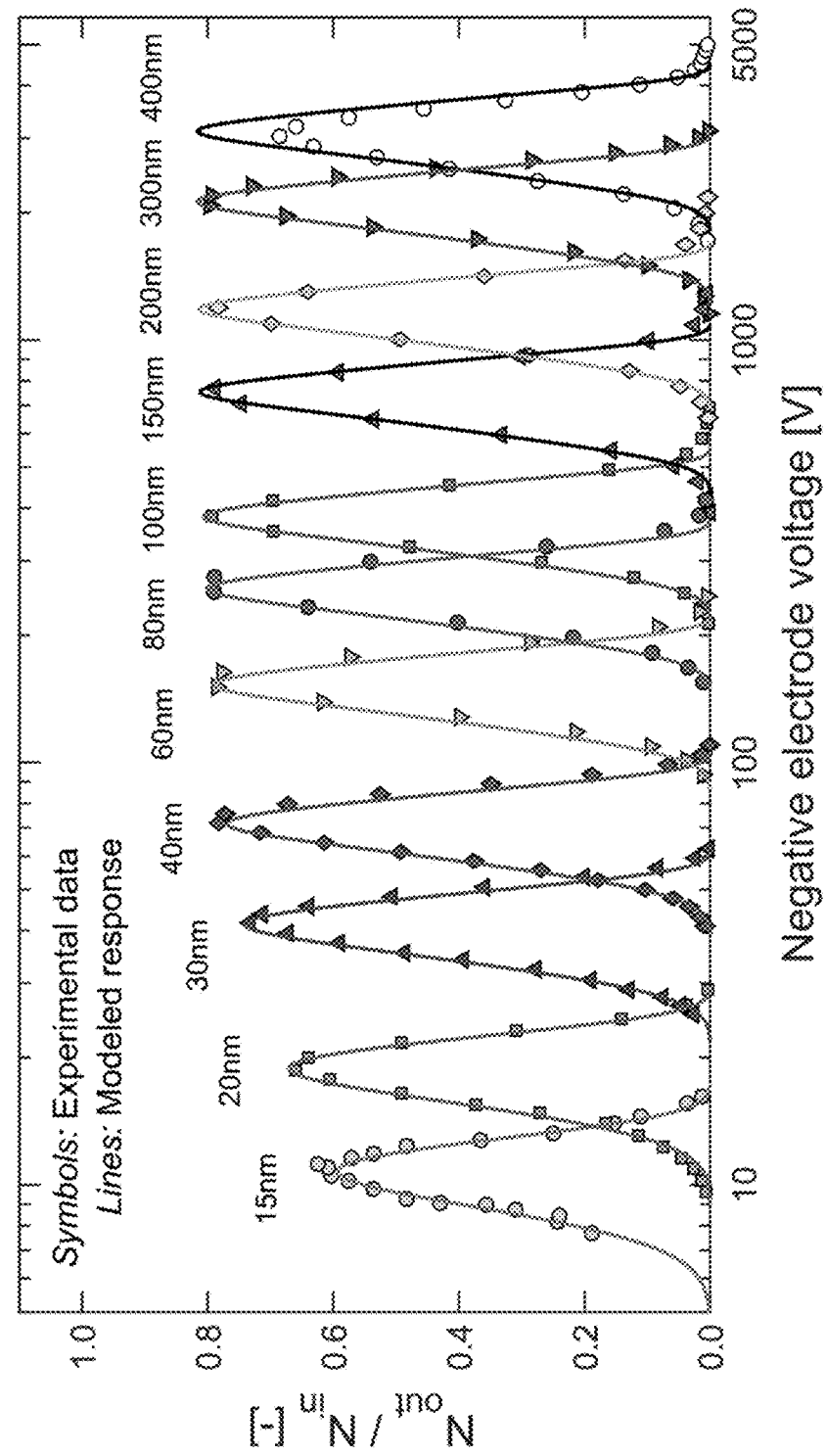
FIG. 14: Simulated and experimental data of the stepping-mode DMA transfer functions operating with a resolution of $R_{ND}$=3 in the 5-5000V electrode voltage range. Experimental data were generated using size-selected, 15-400 nm NaCl particles.

The radial DMA is designed for integration with a detector. For the results presented herein, the detector is an Aerosol Dynamics, Inc. Moderated Aerosol Growth with Internal water Cycling (MAGIC) condensation particle counter (CPC) (although alternative detectors are also encompassed in other embodiments of the present invention). The measurement system comprised of the present invention and the MAGIC has been calibrated by challenging it with known concentrations of mobility-classified sodium chloride aerosol particles for constant voltage operation. The ratio of the concentration detected with this measurement system to the concentration of the monodisperse calibration aerosol is shown in FIG. 14, together with simulated results based on 3D modelling of flow, electric field, and particle trajectories. The instrument transfer functions are quite uniform over this entire size range, and there is a close agreement between simulation and experimental data.

Figure 15:
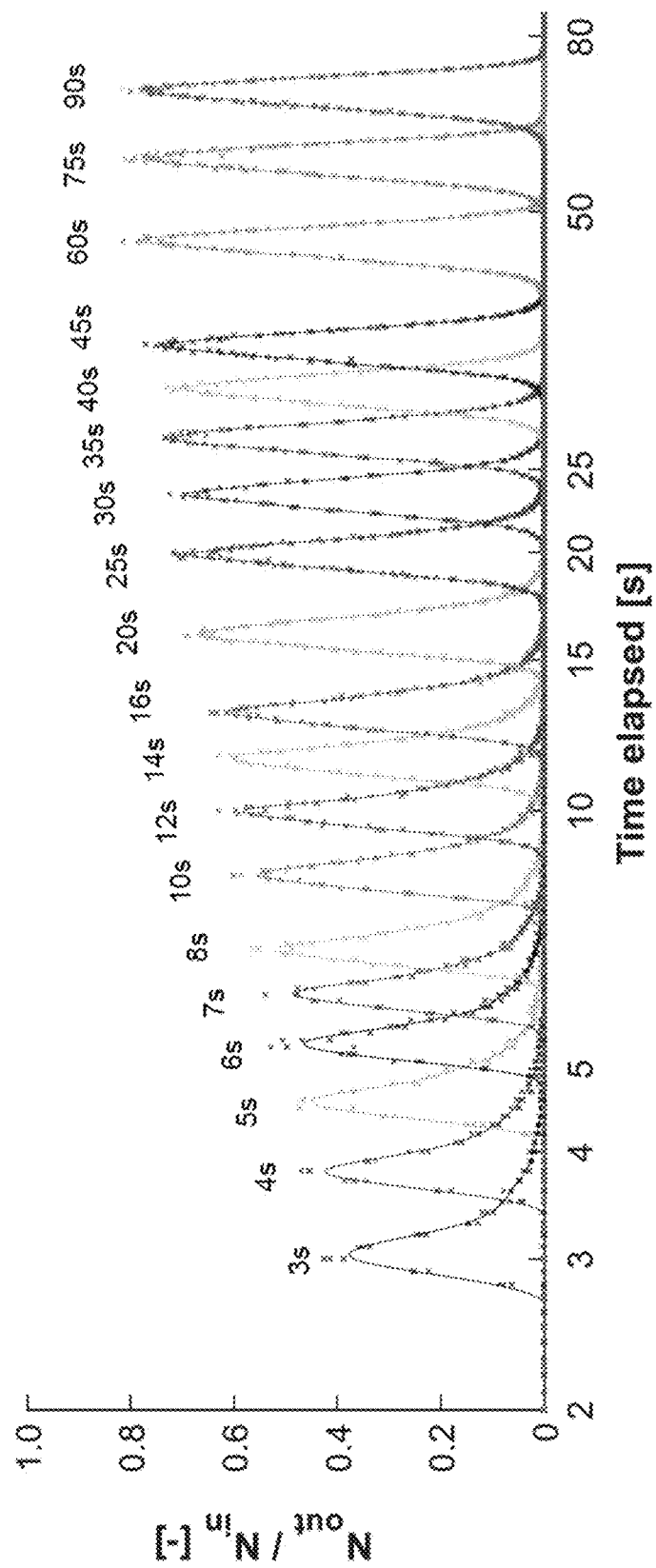
FIG. 15: Experimental response of the DMA coupled to a particle counter sampling 200 nm size-selected NaCl particles, with the DMA operated on exponential increasing voltage ramps (scanning mode) with varying scan times in the 3-90 s range. Results suggest that smearing of the transfer functions begins at <20 s scans, yet remains modest down to 3 s scans. \

The voltage-scanning-mode performance of the combined RDMA/MAGIC-CPC system was determined experimentally by exponentially ramping the voltage from 5 to 5000 V over a total ramp time ranging from 3 to 90 s. FIG. 15 shows the response to a calibration aerosol consisting of 200 nm sodium chloride particles; the response curves remain sharply peaked for scan times as short as 20 s. As the scan time is reduced below this value, the response develops a tail toward long times, but even that distortion remains modest down to 3 s scans. Thus, the system enables fast-scanning capability, which is important in applications such as airborne atmospheric measurements.

8. Cross-Flow DMA Example

Cylindrical DMAs also face the challenge of attaining azimuthal symmetry of the aerosol sample introduction in a geometry in which the aerosol and sheath flows both enter the classification region in a radially symmetric geometry. One of the two flows may be introduced into the cylindrical DMA on axis, typically the sheath flow, while the other must be introduced from an off-center location. The tangential flow, race-track design was first introduced on the cylindrical DMA to attain the required azimuthal symmetry in the aerosol flow around the sample introduction port [9].

An alternative design introduces a long, narrow annular channel to impose the pressure drop necessary to ensure azimuthal symmetry. Many small particles diffuse to the channel walls as the sample flows through this long narrow gap between coaxial cylinders, reducing the effectiveness of this DMA design for the smallest particles.

A flow distribution system incorporating a plurality of channels that attain equal pressure drop by matching their lengths, and discharging into a plenum that then discharges through a large number of strategically-placed small holes ensures azimuthal symmetry in the flow of aerosol sample into the classification region of the cylindrical DMA while minimizing diffusional losses.

Figures 16A, 16B, 16C, 16D:
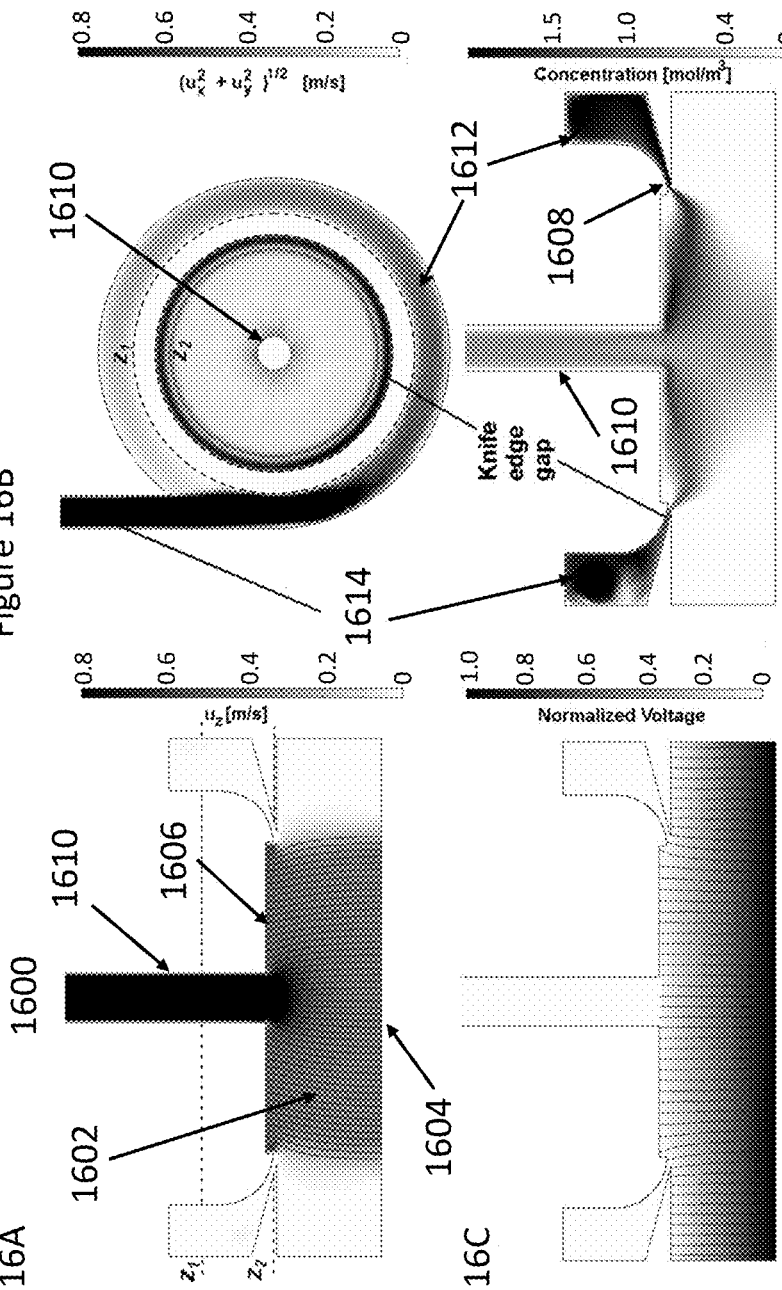
FIGS. 16A-D: Example finite element modeling results for a radial cross-flow DMA for the case of $Q_a/Q_{cf}/R_{nd}/D_Z$=2 liters per minute (lpm)/20 lpm/10/10 nm. Aerosol inlet and outlet tube extremities are cropped out of view. Color scales are restricted in range to distinguish areas of interest. Physical features of interest are labeled.

The radial-flow version of the cross-flow (opposed migration) DMA [5] has similarly employed tangential aerosol sample injection into a racetrack from which the particles enter the classification region through a narrow gap between a fillet at the perimeter of one electrode, and an opposing knife edge ring. Computational fluid dynamics simulations shown in FIGS. 16A-16D reveal that, despite a design that aimed to attain azimuthal symmetry, the flow was not uniformly distributed around the azimuthal entrance port. This reduces the resolution of the cross-flow DMA just as azimuthal maldistribution distorts the flow in the radial co-flow DMA. In this instrument 1600 the cross flow 1602 (e.g., sheath flow) enters through the bottom screen electrode 1604 (FIG. 16A) and exits through the screen top electrode 1606 between the annular aerosol inlet port 1608 and the central classified aerosol outlet port 1610 [12]. The aerosol flow enters the first annular channel 1612 through a tangential inlet 1614. This instrument poses the same challenge as the radial-flow DMA. The flow distribution system described for the radial DMA in the previous sections is well suited for addressing this problem.

Moreover, in another example, replacing the dielectric spacer of the present cross-flow instrument with an electrostatically dissipative material may allow making the cross-flow instrument more compact as it did for the co-flow radial DMA.

FIGS. 17A and 17B are cutaway and perspective views, respectively of a radial cross flow DMA that can incorporate the curved channels in a flow distribution network from plenum as described herein, illustrating aerosol inlet tube 1700; tangential inlet to distribution racetrack 1702; distribution knife-edge 1704; dielectric spacer 1706; classified aerosol outlet tube 1708; incoming cross-flow port 1710; high voltage porous electrode 1712; electrically grounded porous electrode 1714; and outgoing cross-flow port 1716. Overall exterior dimensions are 10.5 cm in height and 11.4 cm in diameter.

Thus, in one or more embodiments the first electrode and the second electrode each include a screen or porous electrode, and the sheath flow is a cross flow that enters through one of the porous electrodes and exits through the other of the porous electrodes, and the aerosol flow including the charged particles enters the first annular channel through curved channels 704. In one or more examples, the curved channels include a plurality of branches, and a smaller number of the channels having a gentler curvature are used as compared to as the channels illustrated in FIG. 7). In one or more examples, the curved channels 704 distribute the flow of the charged particles through equal pressure drop.

9. Example Applications

Conventional instruments provide valuable data, but there is a growing need for measurements to be made in scenarios for which the large, complex, and costly instruments are ill suited. To quantitatively understand the health impacts of very small particles in the workplace or ambient environment, large numbers of sensors need to be deployed. For many studies of health impacts, personal monitors that allow the full exposure history of individual subjects in health studies are needed; community health studies require dense networks that are not presently feasible owing to the high purchase and support costs of present instruments. Surrogate measurements, such as the use of optical dust sensors to estimate $PM_{2.5}$ exposures, are being employed in some such studies, but the data that they produce are questionable, particularly after they have been deployed for some time. Moreover, even perfect $PM_{2.5}$ measuring devices provide limited insight into the dose that an individual may receive since many inhaled particles do not deposit in the airways, but, rather, are exhaled back into the air.

Studies of the effects of health and climatological effects of airborne particles on the atmosphere, or the use of particle measurements to elucidate the sources of the detected particles using platforms such as unmanned aerial vehicles (UAVs) or drones, are also limited by the size, mass, and power consumption of the present instruments. The present disclosure has overcome these limitations by rationally considering the requirements of the measurements so as to design optimal measurement systems. Specifically, in various examples, the mass and power consumption can be constrained by using a small instrument that is capable of operating at a lower flow rate than that of present instruments.

One factor that influences the size and power requirements of a differential mobility analysis system is the precision with which the DMA can resolve small differences mobility. The resolution of a DMA is defined as the mobility of the particles that are transmitted with the highest efficiency divided by the full range of mobilities of particles that are transmitted with at least half of that mobility. For large, nondiffusive particles being classified by a DMA that is operated at constant voltage, the maximum mobility resolution that is attainable is determined by the ratio of the sum of the large sheath and exhaust flow rates, $Q_{sh}$ and $Q_{ex}$, respectively, to the sum of the incoming aerosol sample and classified aerosol outlet flow rates, $Q_a$ and $Q_c$, respectively, i.e., $$R_{ND} = \frac{Q_{sh} + Q_{ex}}{Q_a + Q_c} \tag{4}$$

The actual resolution may be lower due to diffusional effects on particles that are classified at low voltage, or instrument imperfections. Aerosol particle size distribution measurements are typically performed at $R_{ND}$ values of about 10, which is generally sufficient to resolve even sharply peaked particle size distributions.

Atmospheric aerosol size distributions are usually quite broad, therefore studies were undertaken in order to determine what resolution is required to accurately determine such effects as regional deposition within the human airways, a precursor to inducing adverse health outcomes. In these studies, the signals recorded by a DMA measurement system were simulated for specific atmospheric aerosol size distributions using theoretically predicted instrument response functions as a function of the value of $R_{ND}$ at which measurements were made. The simulated measurements included the measurement uncertainty associated with finite count rates in order to accurately reflect actual measurement conditions. The resulting signals were inverted using accepted methods to obtain particle size distributions; the size distributions thus obtained were then used to estimate dose to different regions of the human airways using the accepted ICRP lung deposition model [13].

Figure 18:
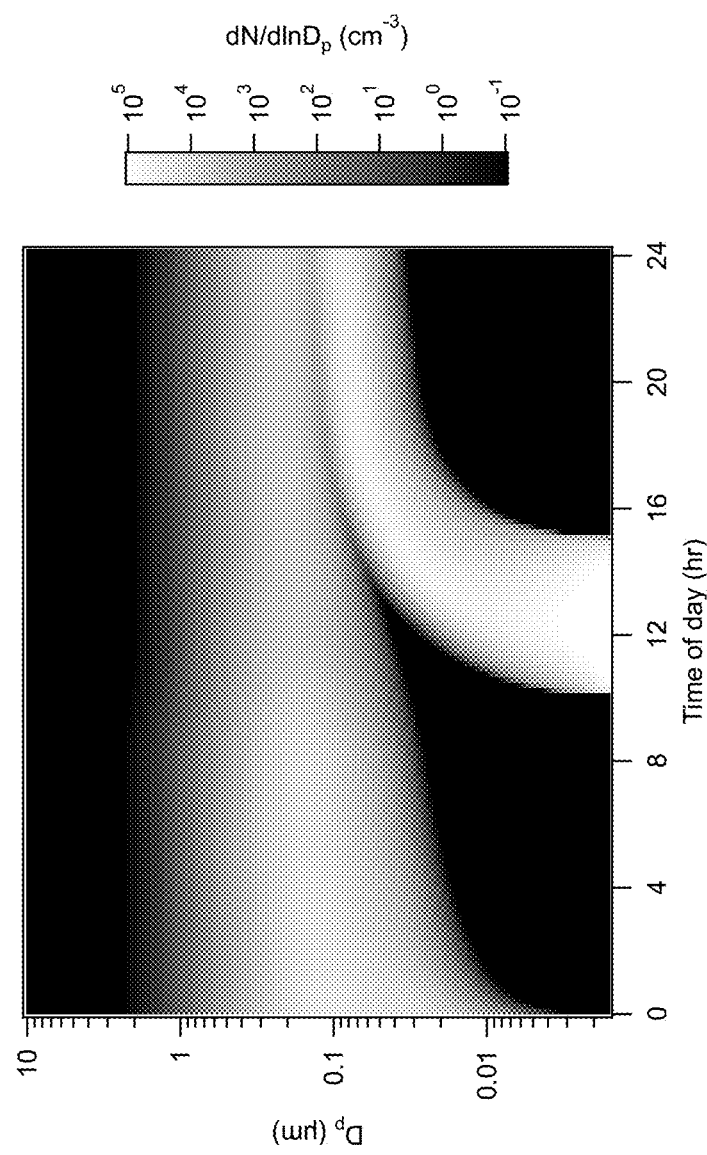
FIG. 18 Simulated particle size distribution for a representative high level particulate pollution episode in New Delhi. Atmospheric measurements were simulated using the Ion-UHMA model from the University of Helsinki, and closely approximate the experimental observations for that region of the particle size distribution that was measured.

FIG. 18 shows the particle size distribution that was used for these in silico tests of the measurement efficacy. These simulations employed modeled particle size distributions in an experimentally observed pollution episode that included effects of a high concentration background aerosol and new particle formation by atmospheric homogeneous nucleation at mid-day, because the simulations include particles that were outside of the range of the instruments employed during field observations. Thus, this in silico test resolves potential dose of particulate pollutants that may have been missed in the actual field observations. Because the mechanisms by which atmospheric particles that deposit in the airways induce adverse health outcomes are not well understood, we examined dose associated with mass deposition as reflected in present-day $PM_{2.5}$ air quality standards, number deposition, which would be an appropriate measure if the number of lesions associated with deposition sites were more closely related to health outcomes, and surface area, which could reflect reactivity of deposited particles.

Figure 19B:
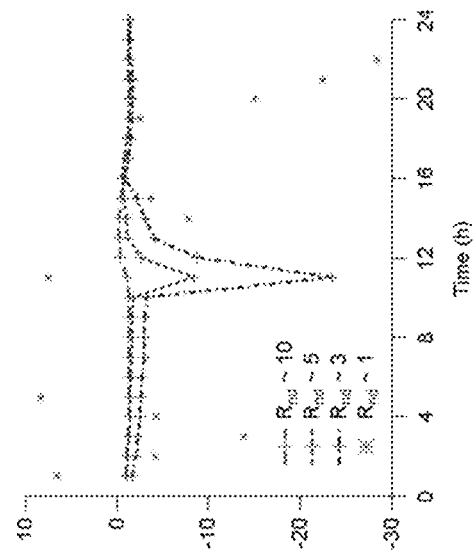
FIGS. 19A-19C. Biases in estimated hourly average number dose to the alveolar region as a function of $R_{ND}$ for the New Delhi pollution event shown in FIG. 18. The heat-plot in FIG. 19A shows the hourly biases as a function of time-of-day and $R_{ND}$.
Figure 19C:
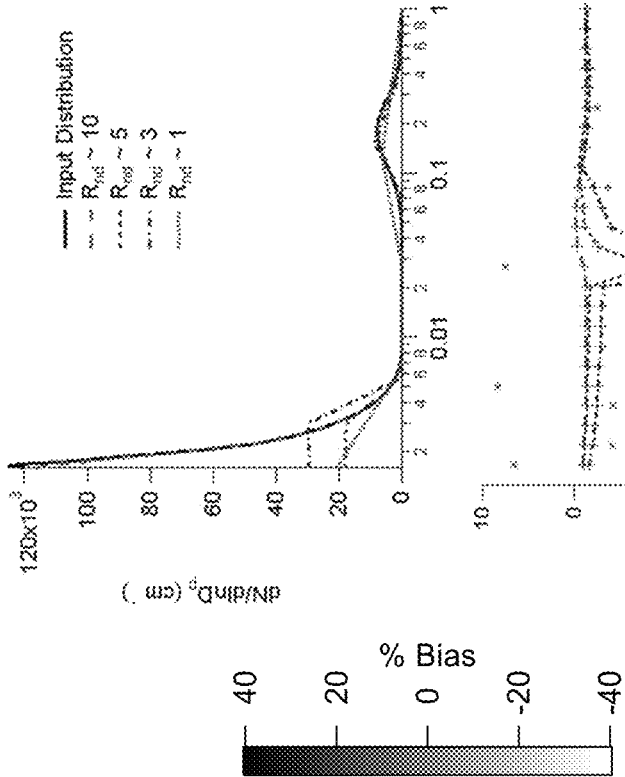
Figure 19A:
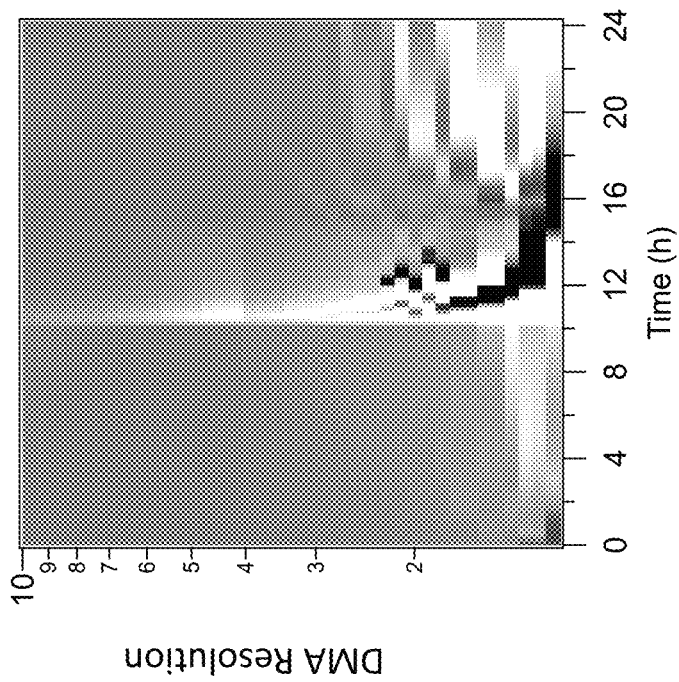

To provide a basis for comparison, FIGS. 19A-19C show the bias in the alveolar dose as a function of the DMA resolution (as defined in Equation 6) according to these three metrics for a simulated $PM_{2.5}$ sampler as a function of the $PM_{2.5}$ concentration (mass of particles smaller than 2.5 μm aerodynamic diameter) obtained in the simulated data. The correlation of alveolar dose with $PM_{2.5}$ is quite high for mass and surface area, but the number dose is inversely, and poorly correlated with $PM_{2.5}$ mass. Thus, one cannot expect that $PM_{2.5}$ data would reveal associations of adverse health outcomes that result from number concentrations.

In contrast, size distribution measurements enable quantification of mass, surface area, and number concentrations of the ambient aerosol as a function of time throughout the simulated episode. Moreover, all three measures of dose estimated for a $R_{ND}=10$ DMA measurement system are well correlated with atmospheric exposure.

FIGS. 19A-19C show the estimated percent-bias in number deposition within the alveolar region of the airways as a function of $R_{ND}$ for the same simulated episode shown in FIG. 18. Simulated lung deposition based upon the ambient particle size distribution is closely approximated by measurements at $R_{ND}=10$. For $R_{ND}<2$, deviations can be substantial, but for $R_{ND}>3$, biases are modest throughout the remainder of the day. Examination of the particle size distribution at noon reveals that the truncation of the size distribution in the nanoparticle regime accounts for much of the bias. Thus, we see that measurements made with quite low $R_{ND}$ can capture most of the dynamics of the atmospheric aerosol, and are sufficient to address many of the health and atmospheric science questions that are the foci of present studies.

As discussed above, prior designs of radial-flow DMAs, and some coaxial cylindrical electrode designs, have employed a tangential inlet of aerosol into a so-called "race track" to attain a uniform distribution of the sample azimuthally around the classification region. The computational simulations described above revealed that, at the targeted low-flow conditions, the tangential inlet design fails to distribute the sample uniformly around the classification region. Moreover, in scanning-mode operation for SEMS/SMPS operation, this aerosol introduction scheme results in a broad distribution of residence times in the inlet to the classification region, thereby limiting the rate at which the mobility can be scanned. Thus, conventional DMA's cannot be used to implement applications using lower resolutions as discussed above.

Embodiments of the DMA described herein, on the other hand, have been designed and optimized for flow, electric field, and particle trajectories so as to provide an instrument capable of lower resolution and lower power measurements. For example, embodiments of the DMA 500 described herein are capable of operating at relatively low resolution ($R_{ND}=2-4$) to minimize both instrument volume and pumping/power requirements, while enabling size distribution measurement with the precision required for planned atmospheric studies. More specifically, an exemplary compact and lightweight, radial-flow DMA 500 as described herein can operate at low aerosol and sheath flowrates (on the order of 0.3 L/min aerosol flow, and 0.6-1.2 L/min sheath flow) in order to provide particle sizing in the 10-500 nm range.

Process Steps

Figure 20:
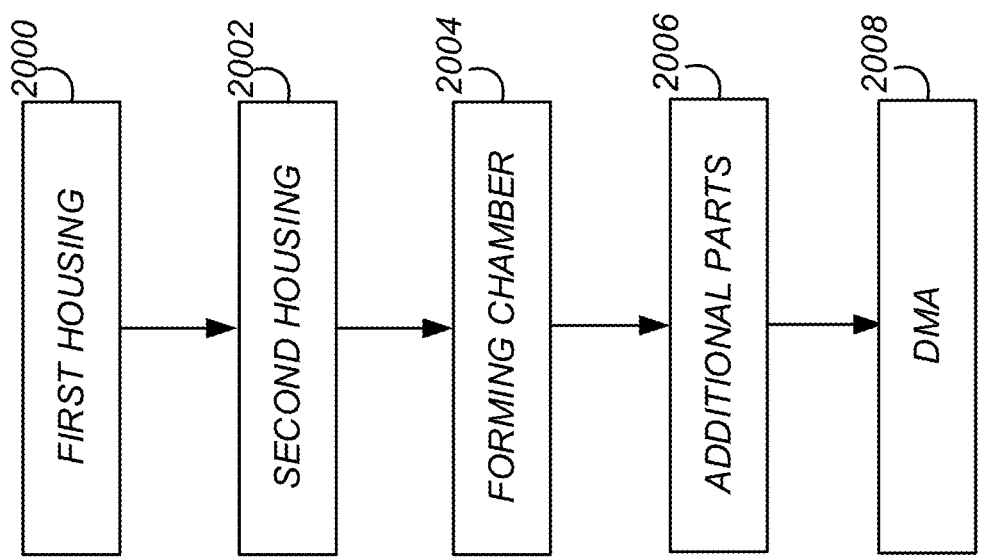
FIG. 20 is a flowchart illustrating a method of making a DMA, according to one or more examples.

FIG. 20 is a flowchart illustrating a method of making a DMA according to one or more examples.

Figure 21:
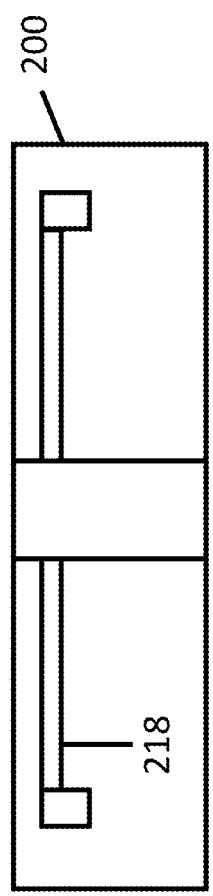
FIG. 21 is a cross sectional schematic of a first housing for an electrode.

Block 2000 represents providing a first housing 200 (e.g., as illustrated in FIG. 2 or FIG. 21) having a first surface 204 and a second surface 206. The first housing houses a first electrode 202, includes a first inlet 208 in the second surface, includes a first annular channel 212, includes a plurality of holes 216, and includes a plurality of curved channels 218 in the second surface. The plurality of curved channels have equal length and connect the first inlet to the first annular channel.

In various examples, the holes (e.g., diameter in a range of 0.25-1 mm) are uniformly or non-uniformly distributed around the first annular channel (e.g., having a width in a range of 0.5-2 mm), the curved channels each include bends having an inner radius curvature that is at least twice a width of the curved channel, and the curved channels have uniform widths.

In yet further examples, the holes and the curved channels are distributed so that a transit time for 90% of the charged particles traveling from the entrance to the first annular channel (from the curved channels) to the central outlet is within 30% of a median residence time, wherein the median residence time is the transit time for 50% of those charged particles that are transmitted to the central outlet 304.

Figure 22:
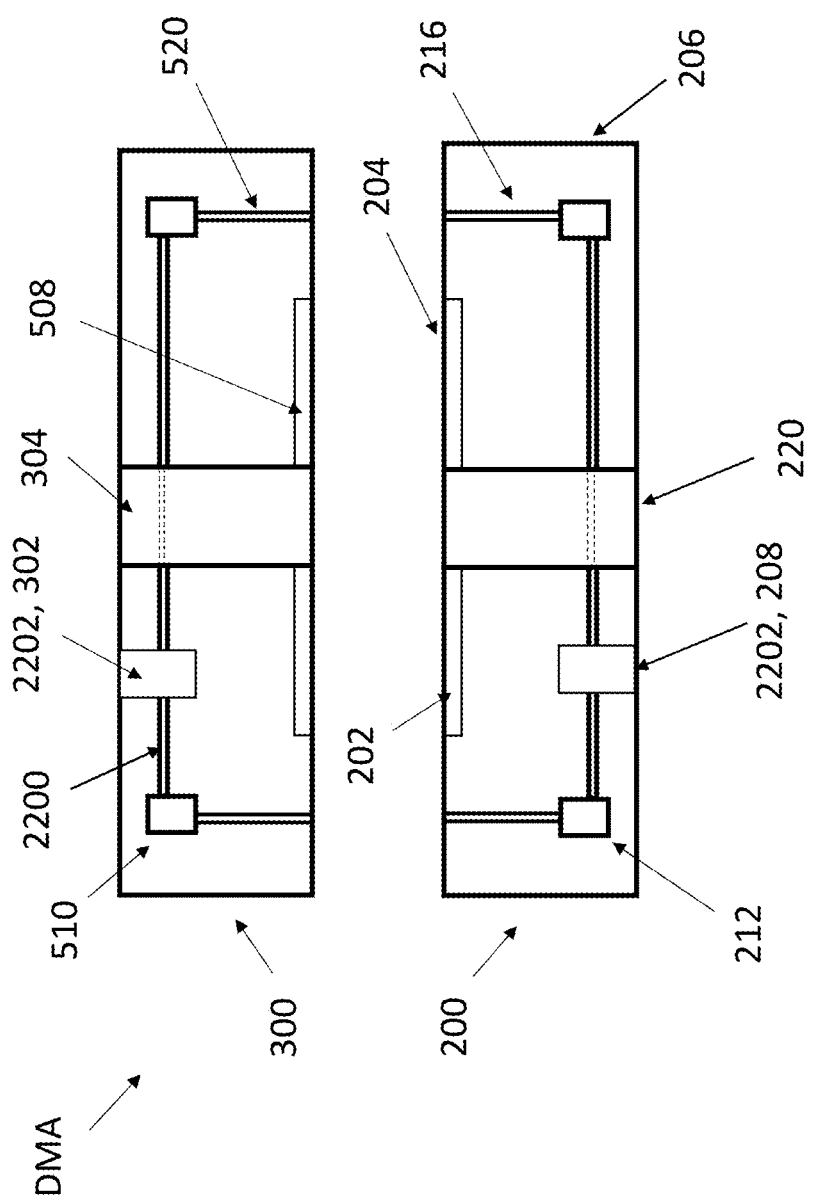
FIG. 22 is a cross sectional schematic of a DMA according to one or more examples.

Block 2002 represents providing a second housing 300, (e.g., as illustrated in FIG. 3 or FIG. 22), wherein the second housing houses a second electrode 508. In one or more examples, both the second electrode and the first electrode have a second circular surface area.

In some embodiments, the second housing includes a second annular channel 510 and the sheath flow is inputted into the chamber through the second annular channel.

In other embodiments, the second annular channel 510 comprises a porous or screen material in communication with the chamber and the sheath flow enters the chamber through pores in the porous material.

Block 2004 represents combining/connecting the first and second housings (or forming the first and second housing as an integrated part) so that a chamber is formed between the first housing and the second housing, the chamber having a first wall including the first electrode and a second wall including the second electrode so that the first electrode is facing the second electrode.

Figure 23:
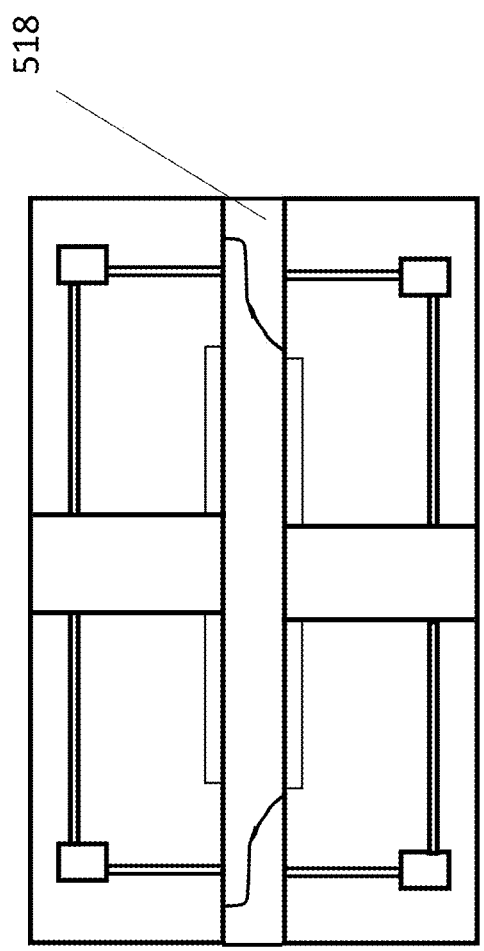
FIG. 23 is a cross sectional schematic of a DMA including an electrostatically dissipative material, according to one or more examples.

In one or more examples, the chamber includes an input region connected to the first annular channel and the second annular channel so that the charged particles and the sheath flow enter the chamber through the input region, the second wall includes an electrostatically dissipative material 518 (see FIG. 23) between the input region to the chamber and the second electrode, and the electrostatically dissipative material comprises a thickness that tapers towards the input region so that a spacing between the first wall and the second wall is gradually reduced in a diffuser region of the chamber interfacing with the input region.

In one or more examples, the electrostatically dissipative material has a surface resistivity in a range of $10^6$-$10^{12}$ $\Omega/cm^2$. Example electrostatically dissipative materials include, but are not limited to, acetals (e.g., Delrin) and other plastics. Acetal materials with additives are available with surface resistivity from $10^{10}$-$10^{12}$ $\Omega/cm^2$. Plastics filled with carbon powder or carbon fiber provide surface resistivities of $10^6$-$10^9$ $\Omega/cm^2$.

In one or more examples, the input region includes a first input channel that interfaces a flow of the charged particles exiting from the holes with the sheath flow from the second annular channel so that the sheath flow and the charged particles impinge on each other in a direction parallel to axis prior to moving sideways and entering a classification region of the chamber.

In one or more examples, the tapered electrostatically dissipative material allows formation of the electric field in the tapered input region so that the electric field has a strong effect on the trajectories of the charged particle trajectories so that an effective radius of the classification region is increased beyond the physical dimensions of the classification region and moves concentration of the electric field away from the input region; and the tapered electrostatically dissipative material allows for a rapid dissipation of the electric field after removal of the higher non-ground voltage so as to minimize or reduce memory effects.

Block 2006 represents optionally providing, as needed, additional parts needed for operation of the DMA.

Block 2008 represents the end result, a DMA (e.g., as illustrated in FIGS. 3, 5, 22 and 23), wherein:

(1) sheath flow is inputted into the chamber (e.g., through second inlet 2202 and curved channels 2200, and second annular channel 510), charged particles inputted into the first inlet are distributed through the curved channels to different sections of the first annular channel;

(2) the charged particles in the first annular channel are distributed through the plurality of holes into the chamber and so as to impinge on the opposing sheath flow outputted from the second annular channel, and the charged particles in the chamber are driven, by an electric field applied between the first electrode and the second electrode, along trajectories leading towards an (e.g., central) outlet in the first housing or the second housing;

(3) the first annular channel and the second annular channel each have radial symmetry about an axis passing through the center of the first housing, the center of the second housing, a center of the first circular area, a center of the second circular area, and a center of the outlet; and (4) the first inlet is offset from the axis.

In one example, the first electrode comprises a ground electrode and the second electrode is biased at a potential difference with respect to the ground electrode so as to form the electric field.

In another example, the second electrode comprises a ground electrode and the first electrode is biased at a potential difference with respect to the ground electrode so as to form the electric field.

In yet further examples, the high voltage electrode has a curved edge to minimize field concentration at an interface with the electrostatically dissipative material.

In one or more examples, the curved channels include a plurality of branches and the curved channels distribute a flow of the charged particles through equal pressure drops between the first inlet and the first annular channel.

In one or more further examples, the DMA includes a first mechanism (e.g., valve or pump) connected to the first inlet and a second mechanism connected to a second inlet to the second annular channel, wherein the first mechanism and the second mechanism control flows of the charged particles and the sheath flow, respectively so that (1) the flow of charged particles into the first inlet is 0.3 L/min or less, (2) the sheath flow into the second inlet is 1.2 L/min or less, and (3) the DMA operates with a resolution $R_{ND}$<4.

In one or more examples, the curved channels and holes are disposed so that mean residence time of the charged particles in the classification region is less than 2 seconds and the electric field is ramped from $10^3$ to $10^6$ volts per meter in, e.g., less than 60 seconds, less than 40 seconds, less than 30 seconds, less than 20 seconds, or less than 10 seconds (these faster ramping times are applicable to all operating modes but may be more important when operating the DMA in scanning mode, e.g., scanning the electric field amplitude).

In one or more further examples, the first electrode and the second electrode each include a screen or porous electrode, and the sheath flow is a cross flow that enters through one of the porous electrodes and exits through the other of the porous electrodes.

In yet a further embodiment (e.g., of the cross flow DMA or non-cross flow DMA), the curved channels include a plurality of branches, and the curved channels distribute a flow of the charged particles through equal pressure drops between the first inlet and the first annular channel. The use of a porous second annular channel may enable using a smaller number of curved channels to attain azimuthal symmetry in the sheath flow.

REFERENCES

The following references are incorporated by reference herein

[1] S. C. Wang, R. C. Flagan, Scanning electrical mobility spectrometer, Aerosol Sci. Technol. 13 (1990) 230-240. doi:10.1080/02786829008959441.

[2] L. M. Russell, R. C. Flagan, J. H. Seinfeld, Asymmetric instrument response resulting from mixing effects in accelerated DMA-CPC measurements, Aerosol Sci. Technol. 23 (1995) 491-509. doi:10.1080/02786829508965332.

[3] P. Dubey, S. Dhaniyala, Analysis of scanning DMA transfer functions, Aerosol Sci. Technol. (2008). doi:10.1080/02786820802220258.

[4] R. C. Flagan, Cross-Flow Differential Migration Classifier, U.S. Pat. No. 6,905,029B2, 2005.

[5] R. C. Flagan, W. Mui, A. J. Downard, Radial Opposed Migration Aerosol Classifier with Grounded Aerosol Entrance and Exit, U.S. Pat. No. 9,095,793, 2015.

[6] S.-H. Zhang, Y. Akutsu, L. M. Russell, R. C. Flagan, J. H. Seinfeld, Radial Differential Mobility Analyzer, Aerosol Sci. Technol. 23 (1995) 357-372. doi:10.1080/02786829508965320.

[7] G. W. Hewitt, The charging of small particles for electrostatic precipitation, Trans. Am. Inst. Electr. Eng. Part I Commun. Electron. 76 (1957) 300-306. doi:10.1109/TCE.1957.6372672.

[8] E. O. Knutson, K. T. Whitby, Aerosol classification by electric mobility: apparatus, theory, and applications, J. Aerosol Sci. 6 (1975) 443-451. doi:10.1016/0021-8502(75)90060-9.

[9] W. Winklmayr, G. P. Reischl, A. O. Lindner, A. Berner, A new electromobility spectrometer for the measurement of aerosol size distributions in the size range from 1 to 1000 nm, J. Aerosol Sci. 22 (1991) 289-296. doi:10.1016/S0021-8502(05)80007-2.

[10] H. Rohmann, Methode Zur Messung Der GroBe Von Schwebeteilchen, Zeitschrift Fiir Phys. 17 (1923) 253-265.

[11] H. A. Erikson, The change of mobility of the positive ions in air with age, Am. Phys. Soc. 18 (1921) 100-101.

[12] W. Mui, H. Mai, A. J. Downard, J. H. Seinfeld, R. C. Flagan, Design, simulation, and characterization of a radial opposed migration ion and aerosol classifier (RO- MIAC), Aerosol Sci. Technol. 51 (2017) 801-823. doi: 10.1080/02786826.2017.1315046.

[13] ICRP, ICRP Publication 66: Human respiratory tract model for radiological protection, Ann. ICRP. (1994). doi:10.1016/0146-6453(94)90029-9.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A differential mobility analyzer (DMA), comprising:
a first housing:
having a first inlet;
housing a first electrode on a first surface, the first electrode having a first circular surface area,
including a first annular channel having a plurality of first holes;
including a plurality of first curved channels connecting the first inlet to the first annular channel;
a second housing connected to the first housing, the second housing:
having a second annular channel;
housing a second electrode, the second electrode having a second circular surface area; and
a chamber between the first housing and the second housing, the chamber having a first wall including the first electrode and a second wall including the second electrode so that the first electrode is facing the second electrode; and wherein:
sheath flow is inputted into the chamber,
particle-laden flow inputted into the first inlet is distributed through the plurality of the first holes into the chamber so as to impinge on the opposing sheath flow outputted from the second annular channel, the particles in said particle-laden flow in the chamber comprising charged particles,
charged particles in the chamber are driven; by an electric field applied between the first electrode and the second electrode, such that those of the charged particles having a selected electrical mobility follow along trajectories leading towards a central outlet in the second housing,
the first annular channel and the second annular channel each have radial symmetry about an axis passing through the center of the first housing, the center of the second housing, a center of the first circular area, a center of the second circular area, and a center of the outlet, and
the first inlet is offset from the axis.

2. The DMA of claim 1, wherein:
the chamber includes an input region connected to the first annular channel and the second annular channel so that the charged particles and the sheath flow enter the chamber through the input region,
the second wall includes an electrostatically dissipative material between the input region to the chamber and the second electrode,
the electrostatically dissipative material comprises a thickness that tapers towards the input region so that a spacing between the first wall and the second wall is gradually reduced in a diffuser region of the chamber interfacing with the input region,
the first electrode comprises a ground electrode and the second electrode is biased at a potential difference with respect to the ground electrode so as to form the electric field, or the second electrode comprises a ground electrode and the first electrode is biased at a potential difference with respect to the ground electrode so as to form the electric field.

3. The DMA of claim 2, wherein the electrostatically dissipative material has a surface resistivity in a range of $10^6$-$10^{12}$ Ω/cm².

4. The DMA of claim 2, wherein the input region includes:
a first input channel that interfaces a flow of the charged particles exiting from the first holes with the sheath flow from the second annular channel so that the sheath flow and the charged particles impinge on each other in a direction parallel to the axis prior to moving radially and entering a classification region of the chamber.

5. The DMA of claim 2, wherein:
the chamber comprises a classification region, and
the electrostatically dissipative material allows formation of the electric field in the tea e input region so that the electric field has a strong effect on the trajectories of the charged particles so that an effective radius of the classification region is increased beyond the physical dimensions of the classification region and moves concentration of the electric field away from the input region; and
the electrostatically dissipative material allows for a rapid dissipation of the electric field after removal of the potential difference so as to minimize or reduce memory effects.

6. The DMA of claim 2, wherein the electrode biased at the potential difference has a curved edge to minimize field concentration at an interface with the electrostatically dissipative material.

7. The DMA of claim 1, wherein:
the first holes are uniformly or non-uniformly distributed around the first annular channel,
the first curved channels each include bends having an inner radius of curvature that is at least twice a width of the first curved channel, and
the first curved channels have uniform widths.

8. The DMA of claim 7, wherein the first holes and the first curved channels are distributed so that a transit time for 90% of the charged particles traveling from the entrance to the first annular channel (from the first curved channels) to the central outlet is within 30% of a median residence time, wherein the median residence time is the transit time for 50% of those charged particles that are transmitted to the central outlet.

9. The DMA of claim 8, further including a first mechanism connected to the first inlet and a second mechanism connecting a second inlet to the second annular channel, wherein the first mechanism and the second mechanism control the particle-laden flow and the sheath flow, respectively so that:
the particle-laden flow into the first inlet is 0.3 L/min or less,
the sheath flow into the second inlet is 1.2 L/min or less, and
the DMA operates with a resolution $R_{ND}$<4.

10. The DMA of claim 1, wherein the first curved channels and first holes are disposed so that mean residence time of the charged particles in the classification region is less than 2 seconds.

11. The DMA of claim 1, wherein:
the first electrode and the second electrode each include a screen or porous electrode,
the sheath flow is a cross flow that enters through one of the porous electrodes and exits through the other of the porous electrodes.

12. The DMA of claim 1, wherein:
the first curved channels include a plurality of branches,
the first curved channels distribute the particle laden flow through equal pressure drops between the first inlet and the first annular channel.

13. The DMA of claim 1, wherein the sheath flow is introduced through a plurality of second holes in the second annular channel.

14. The DMA of claim 13, wherein:
the second housing includes a second inlet,
the sheath flow is introduced at the second inlet, and
the second housing includes a plurality of second curved channels connecting the second inlet to the second annular channel.

15. A differential mobility analyzer (DMA), comprising:
a first electrode having a first circular surface area;
a first annular region;
a first set of holes distributed in a first circle within the a first annular region, the first circle having a first diameter;
a first outlet located symmetrically with respect to a center of the first electrode;
a second electrode having a second circular surface area positioned along a common axis to, and parallel to, the first circular surface area of the first electrode;
a second annular region having an inner diameter larger than a diameter of the second circular surface area of the second electrode;
a second set of holes distributed in a second circle within the second annular region, the second circle having a second diameter, wherein the second diameter is equal to the first diameter;
a second outlet located at a second center of the second electrode;
a classification region comprising an approximately cylindrical space between the first circular surface area and the second circular surface area;
a means to introduce a flow of particle-free gas into the second set of holes;
a means to introduce a particle-laden gas flow into the first set of holes such that the particle-laden gas flow:
impinges on the opposing particle-free flow exiting the second set of holes, and subsequently moves radially inward with the particle-free flow into the classification region; and
a means to apply an electric field between the first electrode and the second electrode;
a means to extract flow from the first outlet; and
a means to extract flow from the second outlet.

16. The DMA of claim 15, further comprising:
an inlet for the particle-laden gas flow and a plurality of curved channels connecting the inlet to the first annular region.

17. The DMA of claim 15, further comprising:
an inlet for the flow of the particle-free gas and a plurality of curved channels connecting the inlet to the second annular region.

18. The DMA of claim 15, further comprising:
a mechanical connection between the first electrode and the second electrode, wherein the mechanical connection comprises an electrostatically dissipative material.

19. The DMA of claim 18, wherein the electrostatically dissipative material has a surface resistivity in a range of $10^6$-$10^{12}$ $\Omega/cm^2$.

20. The DMA of claim 15, further comprising a mechanical connection between each of the electrodes and an electrical ground, wherein the mechanical connection comprises an electrostatically dissipative material.

21. The DMA of claim 20, wherein the electrostatically dissipative material has a surface resistivity in a range of $10^6$-$10^{12}$ $\Omega/cm^2$.

* * * * *